United States Patent
Sassin

(10) Patent No.: US 10,169,378 B2
(45) Date of Patent: Jan. 1, 2019

(54) AUTOMATIC GENERATION OF LOGICAL DATABASE SCHEMAS FROM PHYSICAL DATABASE TABLES AND METADATA

(71) Applicant: Oracle International Corporation, Redwood Shores, CA (US)

(72) Inventor: Michael Sassin, Andover, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 378 days.

(21) Appl. No.: 14/484,227

(22) Filed: Sep. 11, 2014

(65) Prior Publication Data

US 2016/0078064 A1    Mar. 17, 2016

(51) Int. Cl.
G06F 17/30 (2006.01)

(52) U.S. Cl.
CPC .. *G06F 17/30292* (2013.01); *G06F 17/30592* (2013.01)

(58) Field of Classification Search
CPC .............. G06F 17/30292; G06F 17/30592
See application file for complete search history.

(56) References Cited

U.S. PATENT DOCUMENTS

| | | | | |
|---|---|---|---|---|
| 8,311,975 B1 * | 11/2012 | Gonsalves | ........ | G06F 17/30592 707/606 |
| 2007/0136323 A1 * | 6/2007 | Zurek | ............... | G06F 17/30592 |
| 2009/0055439 A1 * | 2/2009 | Pai | .................... | G06F 17/30592 |
| 2009/0063437 A1 * | 3/2009 | Hendrey | ................. | H04L 67/02 |
| 2010/0287185 A1 * | 11/2010 | Cras | .................. | G06F 17/30439 707/769 |

OTHER PUBLICATIONS

Siebel, Siebel Analytics Server Administration Guide, Jul. 2004, Version 7.7.1, Rev. A.*
Bryson, Stewart, "Automated RPD Builds with OBIEE," Rittman Mead—Delivered Intelligence, http://www.rittmanmead.com/2014/02/obiee-rpd-builds/, pp. 1-12 (Feb. 3, 2014).
Kimball et al., The Data Warehouse Tool Kit, Third Edition, (2013).

* cited by examiner

*Primary Examiner* — Usmaan Saeed
*Assistant Examiner* — William P Bartlett
(74) *Attorney, Agent, or Firm* — Jenkins, Wilson, Taylor & Hunt, P.A.

(57) ABSTRACT

Automatic generation of logical database schemas from physical database tables and metadata is disclosed. One exemplary method for automatic generation of logical database schemas from physical database tables and metadata includes identifying physical fact tables in a data repository. The method further includes identifying physical dimension tables in the data repository. The method includes mapping the physical fact tables to logical fact tables. The method further includes mapping the physical dimension tables to logical dimension tables. The method further includes determining relationships between the physical fact and dimension tables. The method further includes logically joining the logical tables based on the identified relationships between the physical tables to form a logical database schema. The method further includes outputting the logical database schema to the user.

20 Claims, 34 Drawing Sheets

Daily Sales Fact Table

Product ID (FK)

Store ID (FK)

Date ID (FK)

Quantity Sold

Dollar Sales Amount

*FIG. 1*

| ID | Product ID | Store ID | Date ID | Quantity Sold | Dollar Sales Amount |
|---|---|---|---|---|---|
| 101 | 1 | 201 | 377 | 44 | 62.20 |
| 102 | 2 | 201 | 377 | 55 | 78.40 |
| 103 | 3 | 201 | 377 | 100 | 180.00 |
| 104 | 4 | 201 | 377 | 121 | 142.60 |
| 105 | 5 | 201 | 377 | 55 | 80.30 |
| 106 | 6 | 206 | 377 | 12 | 17.20 |
| 107 | 7 | 206 | 377 | 33 | 45.40 |
| 108 | 8 | 206 | 377 | 50 | 63.80 |
| 109 | 9 | 206 | 377 | 125 | 112.70 |

FIG. 2

Product Dimension Table

Product ID (PK)
Product Name
SKU Number (Natural Key)
Brand Description
Subclass Description
Class Description
Department Description
Company Description
Package Type
Package Height
Package Width
Package Depth
Volume
Volume Unit of Measure
Weight
Weight Unit of Measure
...

*FIG. 3*

| PROD ID | SKU | Name | Brand | SubClass | Class | Depart | Comp | Volume | Volume UoM |
|---|---|---|---|---|---|---|---|---|---|
| 1 | 112234 | Winter Ale | Sam Adams | Premium | Domestic Beer | Brewed Beverages | Liquor Corp | 12 | oz |
| 2 | 112241 | Oktoberfest | Sam Adams | Premium | Domestic Beer | Brewed Beverages | Liquor Corp | 12 | oz |
| 3 | 112242 | Pale Ale | Sam Adams | Premium | Domestic Beer | Brewed Beverages | Liquor Corp | 12 | oz |
| 4 | 112252 | IPA | Becks | Premium | Foreign Beer | Brewed Beverages | Liquor Corp | 16 | oz |
| 5 | 112300 | Pilsner | Becks | Premium | Foreign Beer | Brewed Beverages | Liquor Corp | 16 | oz |
| 6 | 114422 | Choors | Miller | Domestic | Domestic Beer | Brewed Beverages | Liquor Corp | 12 | oz |
| 7 | 114442 | Choors Light | Miller | Light | Domestic Beer | Brewed Beverages | Liquor Corp | 12 | oz |
| 8 | 115522 | Budweiser | Budweiser | Domestic | Domestic Beer | Brewed Beverages | Liquor Corp | 12 | oz |
| 9 | 115532 | Budweiser Light | Budweiser | Light | Domestic Beer | Brewed Beverages | Liquor Corp | 12 | oz |

FIG. 4

Step 1: Determine Table Types and Initial Validation

AUTOMATIC GENERATION OF LOGICAL DATABASE SCHEMAS FROM PHYSICAL DATABASE TABLES AND METADATA

TECHNICAL FIELD

The subject matter described herein relates to automatic generation of logical database schemas from physical database tables and metadata.

BACKGROUND

Data warehousing tools, such as Oracle Business Intelligence Enterprise Edition (OBIEE), allow logical database schemas to be defined on top of physical database tables. Logical database schemas include patterns that illustrate relationships between underlying physical database tables. For example, it is possible to define star schemas that illustrate relationships between tables and to join tables that are logically related together.

Knowing relationships between underlying database tables is essential in efficiently retrieving data from a database. For example, in order to form database queries that provide meaningful results, it is necessary to specify in each query the tables to be searched and filter criteria for narrowing results to be presented from the combination of tables. Without knowledge of relationships between tables and the structure of data within tables, queries will produce results that are not meaningful to the end user.

A logical database schema defines table structures and relationships between tables in a way that is useful for efficient data retrieval. One possible way to define a logical database schema is to manually analyze the underlying database tables and metadata and build the logical schemas from the analysis. Such a manual process is tedious and can require hundreds of work hours, even for a database with a relatively small number of tables.

Accordingly, there exists a need for methods, systems, and computer readable media for automatic generation of logical database schemas from physical database tables and metadata.

SUMMARY

Automatic generation of logical database schemas from physical database tables and metadata is disclosed. One exemplary method for automatic generation of logical database schemas from physical database tables and metadata includes identifying physical fact tables in a data repository. The method further includes identifying physical dimension tables in the data repository. The method includes mapping the physical fact tables to logical fact tables. The method further includes mapping the physical dimension tables to logical dimension tables. The method further includes determining relationships between the physical fact and dimension tables. The method further includes logically joining the logical tables based on the identified relationships between the physical tables to form a logical database schema. The method further includes outputting the logical database schema to the user.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawings, wherein like reference numerals represent like parts, of which:

FIG. 1 is a diagram of a fact table;

FIG. 2 is a diagram of a fact table populated with product sales data;

FIG. 3 is a diagram of a dimension table;

FIG. 4 is a diagram of a dimension table populated with product dimension data;

DETAILED DESCRIPTION

Figure 5:
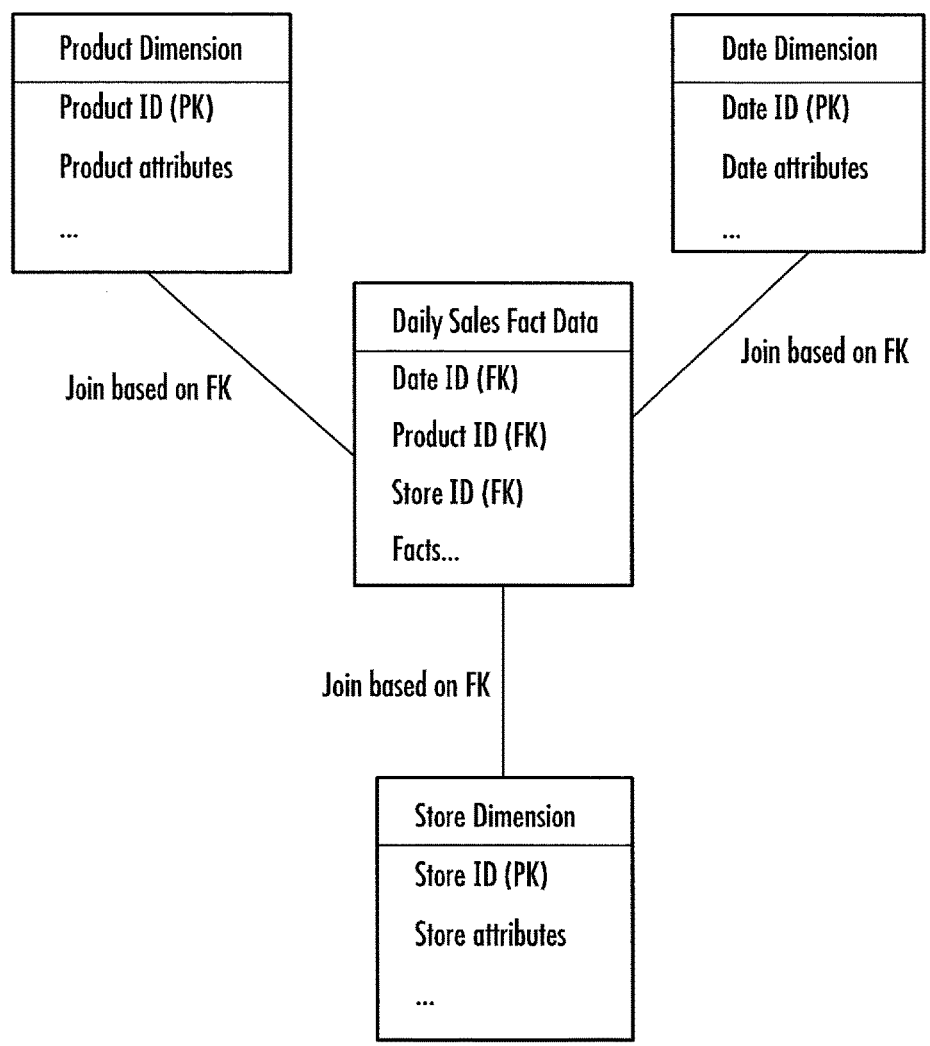
FIG. 5 is a diagram illustrating a logical star schema.

In accordance with the subject matter disclosed herein, systems, methods, and computer readable media are provided for automatic generation of logical database schemas from physical database tables and metadata. Such a process includes identifying physical fact tables, dimension tables, and relationships between tables and using metadata associated with the identified tables to merge related tables and generate logical schema that are useful for subsequent data retrieval and database updating.

The naming conventions used herein are consistent with those described in *The Data Warehouse Tool Kit*, Third Edition, by Ralph Kimball and Margie Ross, copyright 2013, the disclosure of which is incorporated herein by reference in its entirety. This document will hereafter be referred to as "Kimball".

A fact table in a dimensional database model is a table that stores measurements for events. FIG. 1 illustrates fact table for daily sales facts. In FIG. 1, the fact table includes rows that correspond to data items that would be present for a sale of a product. In the illustrated example, these items include product ID, store ID, date ID, quantity sold, and dollar sales amount. Even for a single store in a single day, there could be hundreds or thousands of entries in such a table.

Some of the rows in the fact table are foreign keys (FKs). A foreign key is a link to a dimension table. A dimension table is a table that stores context associated with an event that that is referred to by one or more fact tables. In the daily sales fact table, the product ID, stored ID, and date ID attributes that refer to one or more dimension tables.

As stated above, a fact table may include measurements from each sales transaction that occurs in a time period. FIG. 2 shows the fact table of FIG. 1 populated with measurement data. In the fact table illustrated in FIG. 2, each row corresponds to a single transaction (e.g., a sale), and each column corresponds to a measure, which are also foreign keys. In the real world, a product sales fact table such as that illustrated in FIG. 2 could include billions of rows, each with many different links or keys to dimension tables. Such a fact table may be part of a data warehouse schema that is initially imported into a data warehousing tool, such as OBIEE. In order to properly format structured queries to the database, it is necessary to know the relationships between the tables, which is referred to as the database schema.

In order to make queries and updates to database tables more efficient, a logical layer can be defined on top of physical database tables, and a presentation layer may be defined on top of the logical layer. Defining a logical database schema includes defining logical fact tables from physical fact tables, defining logical dimension tables from physical dimension tables, and linking the logical tables. Examples of how logical fact and dimension tables are defined and linked will be provided below.

A dimension table is a table to which one or more fact tables point and which stores attributes that describe a dimension. A dimension table contains a single primary key that corresponds to a foreign key in an associated fact table. FIG. 3 illustrates a dimension table concept for the product dimension in the fact table of FIG. 1, and FIG. 4 illustrates the dimension table populated with attributes for the product dimension. For example, as illustrated in FIG. 3, a product dimension table may include a hierarchy of product identification identifiers, such as SKU, name, subclass, class, department, etc. The product ID attribute is a primary key (PK). The primary key is a unique key that identifies a dimension table column. In FIG. 3, the primary key product ID identifies the first column in the physical dimension table illustrated in FIG. 4. The primary key product ID is also embedded as the foreign key in the fact table illustrated in FIG. 1. A natural key is a key that is created subject to a business rule outside of the control of the data warehousing system. In the illustrated example, the SKU number is a natural key because it is created by the inventory control system of a retail establishment. It should be noted from the dimension table in FIG. 4 that each product ID 1-9 includes plural attributes.

In order to determine sales for a particular product at a particular store, it would be necessary to specify in the query the fact table illustrated in FIG. 2, the dimension table illustrated in FIG. 4, and a filter on the product ID of interest. However, the query originator may not know the relationship between the tables and thus may not format the query correctly. The problem becomes more difficult as the number of tables and interrelationships increase. In order to avoid this problem, it is necessary to define a dimensional schema that shows the logical relationships between tables.

A dimensional schema is a representation of relationships between logical dimension tables and logical fact tables. Such a dimensional relationship may be generated manually by a database developer based on logical facts and relationships with dimensions. FIG. 5 illustrates an example of a star schema generated from the sales fact table in FIG. 1 and its associated dimension tables. In the illustrated example, a daily sales logical fact table includes the categories for the measures illustrated FIG. 1. The logical fact table is logically joined dimension tables, a product dimension table, a date dimension table, and a store dimension table, each of which contains attributes for a particular dimension, where the dimensions are product, date, and store.

Creating a complete logical dimensional database schema for an underlying physical database schema requires many work hours and would be cumbersome if performed manually, for even a schema with tens of tables. Accordingly, the subject matter described herein includes methods, systems, and computer readable media for automatically generating logical database schemas from physical database tables and metadata.

According to one aspect, the subject matter described herein includes a logical database schema generator that transforms physical database tables and metadata into business intelligence (BI) tool metadata describing the logical schema structure. The base mechanism for the logical database schema generator may be table, view and column metadata, primary keys (PKs) and FK relationships, database table and column comments, and dimensions objects. The logical database schema generator may also utilize constraints, indexes and other metadata to generate the logical database schemas.

The logical database schema generator may enhance or extend physical schema metadata with metadata derived from base schema using conventions, e.g., naming conventions or default assumptions (measure aggregation rule, target level rule). The logical database schema generator may also use explicit overrides and definitions from external files in case information cannot be derived, e.g., target hierarchy level, derived measure definitions or aggregation rules, when deriving the logical database schema.

According to one aspect, the logical database schema generator may utilize naming conventions used by the database creator to name underlying tables and attribute columns to generate the logical database schemas. The following suffixes may be used by the logical database schema generator to identify types of tables:
_F: Fact table
_A: Aggregate table
_B: bridge table
_D: dimension table
_MD: mini-dimension
_DH: dimension hierarchy table The following suffixes may be used by the logical database schema generator to identify different types of table columns:
_NUM, _ID: sequence number in F
_FLAG: degenerated dimension column in F
_WEIGHT: weight in B
_WID: FK column in all table types
_CODE, _CD: level key in D, DH
_DESC: level key description in D, DH
_lvl<i>: level in DH table It should be noted that the naming conventions may be configurable and are not limited to the examples described herein.

According to another aspect of the subject matter described herein, the logical database schema generator may utilize naming conventions for foreign keys to identify target hierarchy levels in a table referenced by a foreign key and the cardinality of table relationship used with a foreign key name. The following naming conventions may be used:
_lvl<i>: target hierarchy level <i> in hierarchy table referenced by FK
_1-1: cardinality of table relationship used with FK name; default is N-1

The first naming convention above _lvl<i> indicates the target hierarchy level i in a hierarchy table referenced by a foreign key. The particular naming convention is applicable only in case a reference is made to a hierarchy table (DH) as described herein with respect to FIGS. 12 and 14. Typically, a shrunken dimension can be incorporated into a DH table and FKs can be referred to the same PK. The main approach to support this variation is through the introduction of a "level" column that indicates the level to which a row belongs. So, a level 3 hierarchy may contain a "3" to differentiate it from other values. The main purpose of this metadata is to provide the business intelligence (BI) tool details about the aggregation level of an aggregate table. The second foreign key naming convention above identifies the cardinality of table relationships. For example, a foreign key followed by _1-1 would indicate a one to one relationship between the foreign key and its associated fact table.

The logical database schema generator described herein may apply validation rules to identified patterns prior to reporting the logical constructs to the user. The following illustrates exemplary validation rules that may be applied by the logical database schema generator described herein:
Business names for each table column must be unique for a table
Ensure that naming conventions and pattern constraints do not contradict; e.g. bridge table without weight column or FK with level details but referenced table does not contain levels or less levels
Check if patterns are "almost' matched and report As described above, one aspect of the logical database schema generator is to identify patterns in underlying physical database schema and map the patterns to logical tables. The following description conventions are used in the remaining Figures and description to describe the different types of tables:
f: physical fact table
a: physical aggregate table
b: physical bridge table
d: physical dimension table
md: physical mini-dimension table
dh: physical hierarchy table
F: logical fact table
D: logical dimension table "Physical tables" as used herein are database tables that exist prior to processing by the logical database schema generator. "Logical tables" refer to database tables that exist after processing by the logical database schema generator. In addition to the description conventions above, a dashed arrow indicates a mapping between a physical table and a logical table. A solid arrow with the word "type" over the arrow indicates a relationship between two physical or two logical tables, e.g., foreign key (FK).

Figure 6:
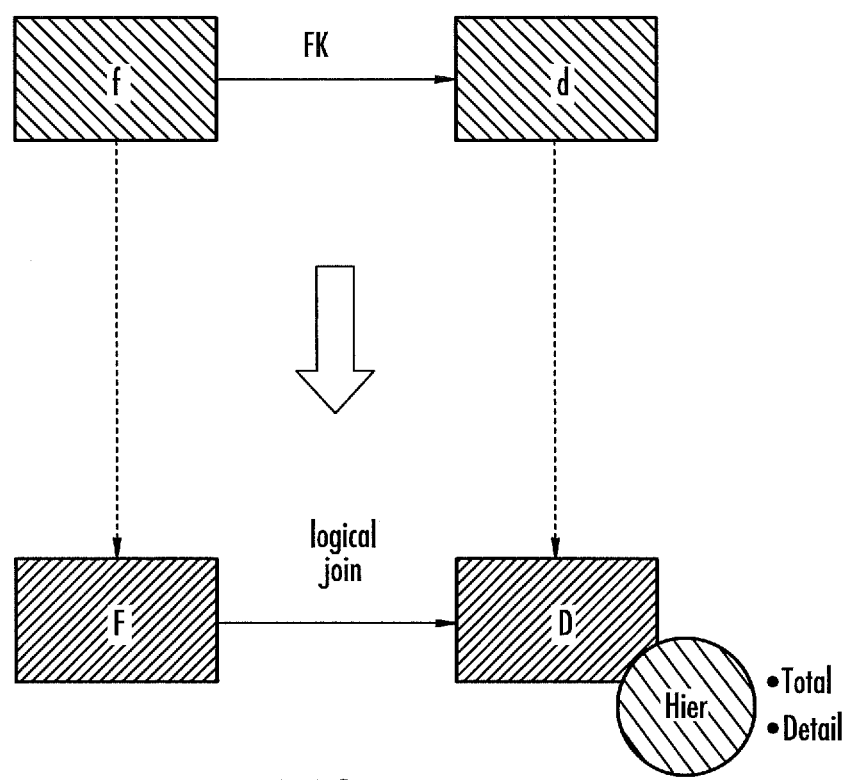
FIG. 6 is a diagram illustrating a mapping between a fact table with a foreign key relationship to a dimension tables to a logical star schema according to an embodiment of the subject matter described herein.

FIG. 6 illustrates a simple star pattern that can be identified by logical database schema generator as described herein. Referring to FIG. 6, a physical fact table f contains a foreign key relationship to a physical dimension table d. The logical database schema generator described herein maps physical fact table f to logical fact table F and physical dimension table d to logical dimension table D. The foreign key is used to logically join physical fact table f to logical dimension table d. Fact table measures which are columns of type number that are not surrogate key (SK) or FK columns can be aggregated by an aggregation rule that is set by default to sum the values in the columns. A surrogate key is typically an integer-valued key assigned by the data warehousing system to uniquely identify a dimension table. A default logical hierarchy is created to describe the grand total (i.e., the sum of each non-SK and non-FK column) and detail level referring to the grain level of the fact table.

As in illustration of a default logical hierarchy, levels in a hierarchy above Detail (which is the product in case of FIG. 4) are used to group a larger number of dimension rows to aggregate all facts related to them. For example, in FIG. 4, the hierarchy would be Product (Detail)→Brand→Sub-Class→Class→Department→Company→Grand Total. For example, a filter criteria Class="Foreign Beer" can be selected, which will retrieve all foreign beer product rows. When joined with the fact table, the result will be all sales related to foreign beers. Typically, it is desirable to aggregate (sum) the measures associated with the facts (dollar sales amount) for the rows associated with foreign beers. This sum may be displayed as part of the generated logical hierarchy in FIG. 6.

The logical database schema generator described herein may use the following business rules to derive logical dimension tables:

Rules for identifying a physical dimension table:
naming convention, e.g., suffix _D or
has text columns and no weight column (i.e., a column in a bridge table with the naming convention _WEIGHT)
A logical dimension table may be created using the following rules:
Logical dimension table name is business name in f's physical FK column comment; add "Dim-" prefix
Map columns from physical table to logical dimension table;
column name is business name contained in physical column comment
Do not map physical table PK or some or all system columns (use exclusion list)

As indicated above, comments from fact table FK columns may be used to determine the name for a logical dimension table. For example, in the sales table illustrated in FIG. 1, the FK column Date_ID may contain a comment "Sales Date - - - <technical description of the column>". The business is the part of the column comment that is before the "- - - " separator (separator can be configured), which is in this case "Sales Date". So, the logical dimension to be created is named "Dim-Sales Date".

According to one aspect of the subject matter described herein, the logical schema generator may identify shared dimensions. A shared dimension is a dimension that has a foreign key relationship with more than one fact table. The following business rules may be used to identify a shared dimension:
f1→d and f2→d and same business name of FK columns in f1 and f2 to d
A shared logical dimension D is created once and both logical fact tables F1 and F2 define a logical join to logical dimension D Identifying shared dimensions enables cross-drilling between multiple facts.

According to another aspect, the subject matter described herein may derive logical hierarchies from physical dimension tables and create an indication of the hierarchies in logical dimension tables. The following rules may be used to derive a default logical hierarchy with minimal required levels "grand total" and "detail:
Create dimension; name is dimension table name without "Dim-" prefix
Create default Detail and Grand Total levels and make Detail child of Grand Total
Set aggregation level of mapped table source to Detail
Map all columns visible in Logical table to Detail level
SK assigned the drill key for Detail level
Convention may identify a column containing drill key display name, is shown, not used by BI tool for queries:
"_DESC" posffix or
column for which a UK is defined
Name of Grand Total and Detail level based on Dimension/Hierarchy business name
Grand Total: All <Business Name>s—notice plural 's'
Detail: <Business Name>

For example for a "Patient" Dimension: the Grand Total level may be called "All Patients" and the Detail level may be called "Patient".

As stated above, according to one aspect of the subject matter described herein, the logical database schema generator may derive logical fact tables from physical fact table. In order to derive a logical fact table, a physical fact table must first be identified. The following rules may be used to derive a logical fact table.

Identify physical fact table using the following rules:
naming convention, e.g. posffix "_F" or
no incoming FK except from bridge table, only outgoing FK relationships, columns are not hierarchy level columns (e.g. containing "_LVL") and columns with text type are either degenerated dimension or not a measure.
Define logical fact table from identified physical fact table using the following rules:
Logical fact table F name is business name contained in physical table f comment; add "Fact-" prefix
Map columns from physical table f to logical fact table F; column names are business names contained in physical column comment
Do not map system columns of physical table; use configurable exclusion list
Do not map physical table FK columns
Columns with number data type are identified as measures
Default Measures aggregation rule set to SUM
Set other aggregation rule if metadata is provided using column naming convention (e.g. _AVG postfix→set AVERAGE rule) or explicitly in text file.

Create logical joins between logical fact table and logical dimension table
  Add Logical Join between logical fact and F logical Dimension D to reflect equivalent FK relationship between physical tables f and d
  Set Aggregation level on table source f of Logical Fact F table to Detail level of logical dimension D if Logical Fact F has a Logical Join with Dimension D; otherwise set to Total level for logical dimension D to define fact f's grain
Create any needed factless fact tables using the following rules:
  No physical table column is identified as measure
  Create logical measure of constant value "1"; configurable name, e.g. "activity count"
  Set logical measure aggregation rule to SUM
  Aggregation level for this source table as in standard case A factless fact table is a fact table that captures relationships between involved keys without storing any measurement metrics. An example of a factless fact table for retails sales may be a fact table that stores foreign keys for a product promotion.

According to another aspect of the subject matter described herein, the logical database schema generator may identify role playing dimensions. A role playing dimension is a dimension that is used for multiple applications within the same database. For example, a "Date" dimension may be used for both "Date of Sale" and "Date of Delivery". A role playing dimension is referred to multiple times in a fact table with each reference linking to a logically distinct role for the dimension.

Figure 7:
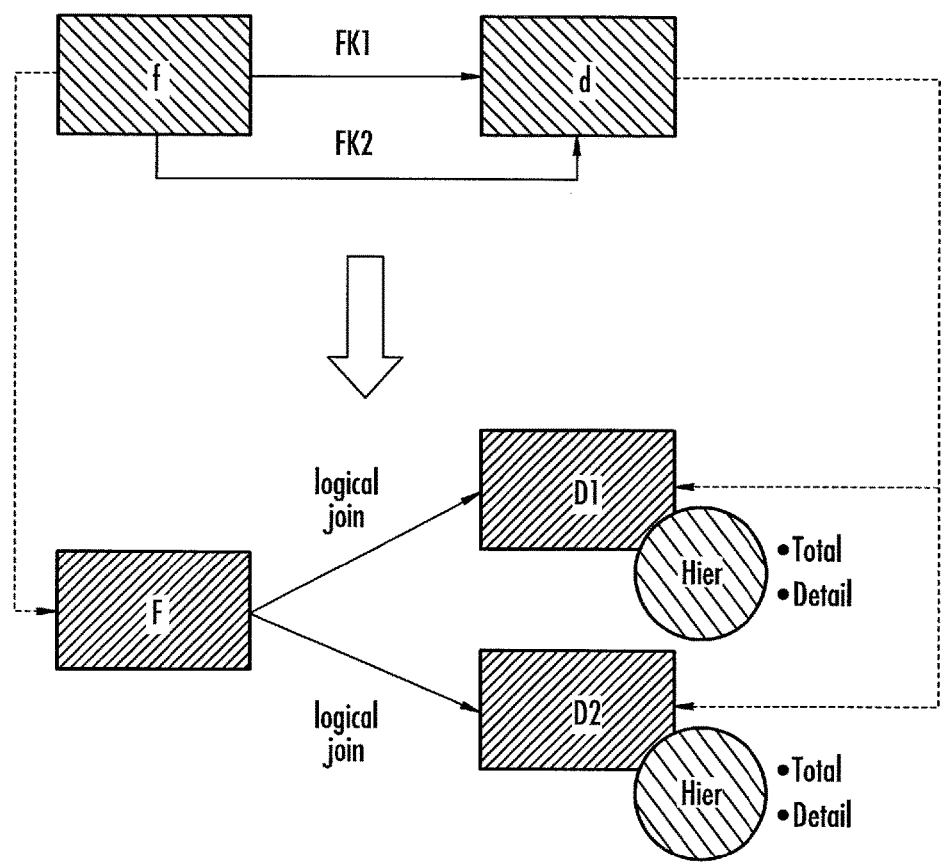
FIG. 7 is a diagram illustrating a role playing dimension and a corresponding mapping to a logical database schema according to an embodiment of the subject matter described herein.

FIG. 7 illustrates an example of a physical schema with a corresponding role playing dimension. In FIG. 7, the physical fact table f includes two foreign key relationships FK1 and FK2 to the same physical dimension table d. The resulting logical schema at the bottom of FIG. 7 illustrates the role playing dimension. In order to generate the logical schema for a role playing dimension, the physical dimension table d is mapped to logical role playing dimension tables D1 and D2 and separate hierarchies. The name of each logical dimension tables is based on FK business name (contained in FK column comment). Logical joins are made between F and role playing dimensions D1 and D2.

Figure 8:
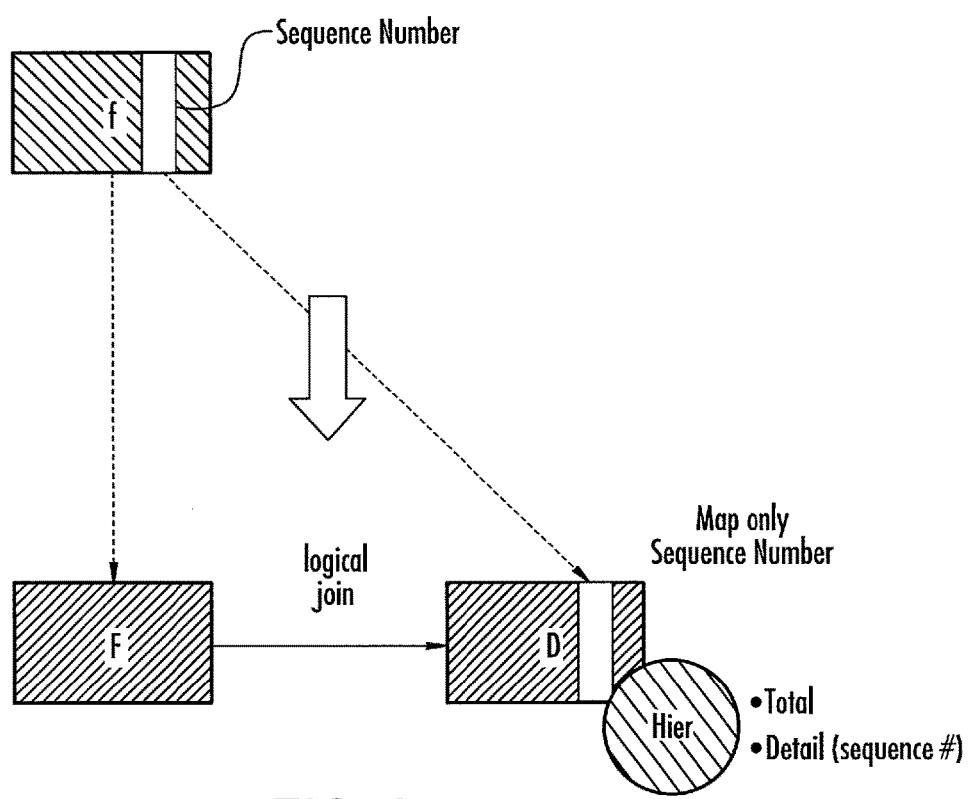
FIG. 8 is a diagram illustrating a degenerated dimension and a mapping to a logical database schema according to an embodiment of the subject matter described herein.
Figure 9:
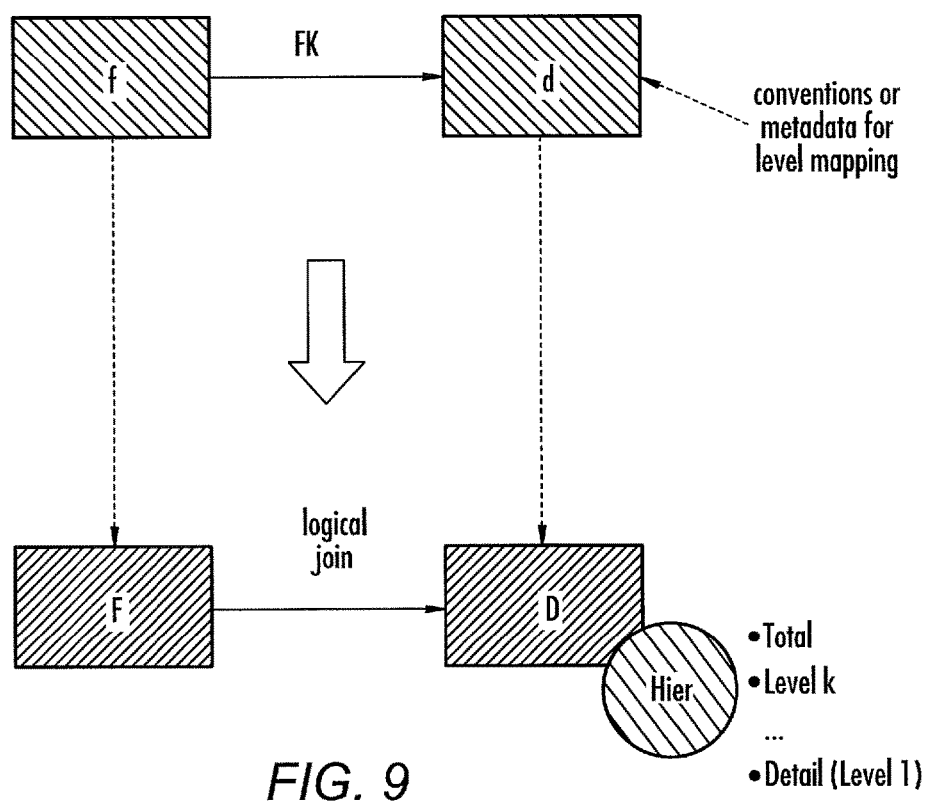
FIG. 9 is a diagram illustrating a dimension table with an embedded hierarchy and the mapping to a logical database schema according to an embodiment of the subject matter described herein.

The following business rules may be used for identifying a role playing dimension:
  Business Rules applied to each role-playing dimension is same as rules for f→d pattern.
    business names for f's FK columns that refer to d are unique for f and thus creating separate logical dimensions
    However: Logical role-playing dimensions can be shared across different logical facts According to another aspect of the subject matter described herein, the logical database schema generator may be used to identify a degenerated dimension. A degenerated dimension is a dimension that is contained completely within a fact table without a corresponding dimension table. For example, a degenerated dimension may be found in a physical fact table f that contains a column with a sequence number, such as transaction ID. In order to generate the resulting logic table structure illustrated in FIG. 8, the following steps are performed:
  Physical fact table f is mapped to logical fact table F; physical fact table f is mapped to logical dimension table D
  Create logical table D for "degenerated dimension"; map only column only defines fact table sequence number
  Add logical join between fact F and dimension table D and default dimension hierarchy with total and detail level as with basic star According to another aspect of the subject matter described herein, the logical database schema generator may identify a dimension table with an embedded hierarchy and map such a table to a logical star topology that includes the total and describes the hierarchy. FIG. 9 illustrates an example of processing a dimension table with an embedded hierarchy. In FIG. 9, the fact table f has a foreign key relationship to a dimension table d. The dimension table d attributes encode k levels in a hierarchy with at least one column associated with a level, e.g., address: country, state . . . . Additional metadata may be required to identify mapping to levels: e.g., a) Oracle (other) DB dimension object or b) Naming conventions based on prefix/postfix.

In FIG. 9, the resulting logical schema includes a basic star that describes the total and k>1 levels including detail.

Figure 10:
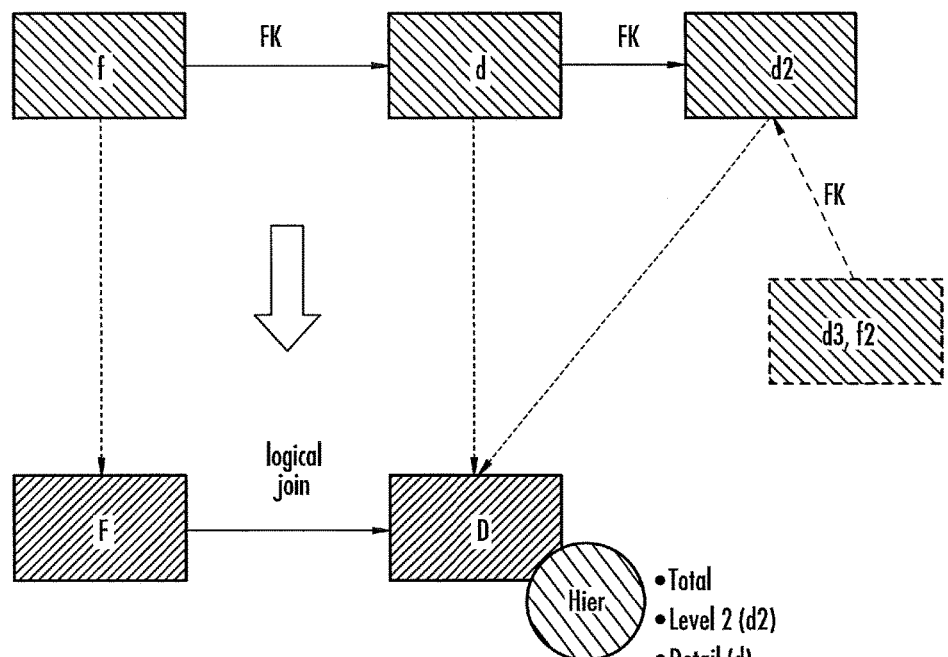
FIG. 10 is a diagram illustrating a dimension referring to a shared dimension and a mapping to a logical database schema according to an embodiment of the subject matter described herein.

The following business rules may be used to derive a logical dimension table with an embedded hierarchy:
  Business rules for simple star apply
  Identify hierarchy levels and associated attributes:
    Use Oracle Dimension object or equivalent definition in separate file or
    Exploit naming conventions and column order to derive same metadata
    Use "_CODE" and "_DESC" to identify drill key and drill key descriptions for levels
    Define detail level before higher levels
    Assume: drill key spec is ordered starting with level drill key (exception Detail level)
  Extension to simple star rules:
    Add levels identified between Detail and Total; define parent-child relationship using level order, "|v|<i>" column name substrings or metadata (Dimension- or file-based)
    Define drill key and drill key display columns; e.g. using for given level column with "_CODE"/ "_DESC" postfix
    Derive level name from drill key column business name (description or code column if n/a)
    Associate attributes to assigned level According to another aspect of the subject matter described herein, the logical database schema generator may identify dimensions that refer to shared outrigger dimensions and generate logical schema that illustrate the dimensions that illustrate the shared outrigger dimensions. FIG. 10 illustrates an example of a dimension that refers to a shared outrigger dimension table and the corresponding logical schema. In FIG. 10, a physical fact table f has a foreign key relationship to physical dimension table d, which has a foreign key relationship to shared physical outrigger dimension table d2. A foreign key relationship to d2 exists from unrelated dimension d3 or separate fact/bridge table f2.

Figure 11:
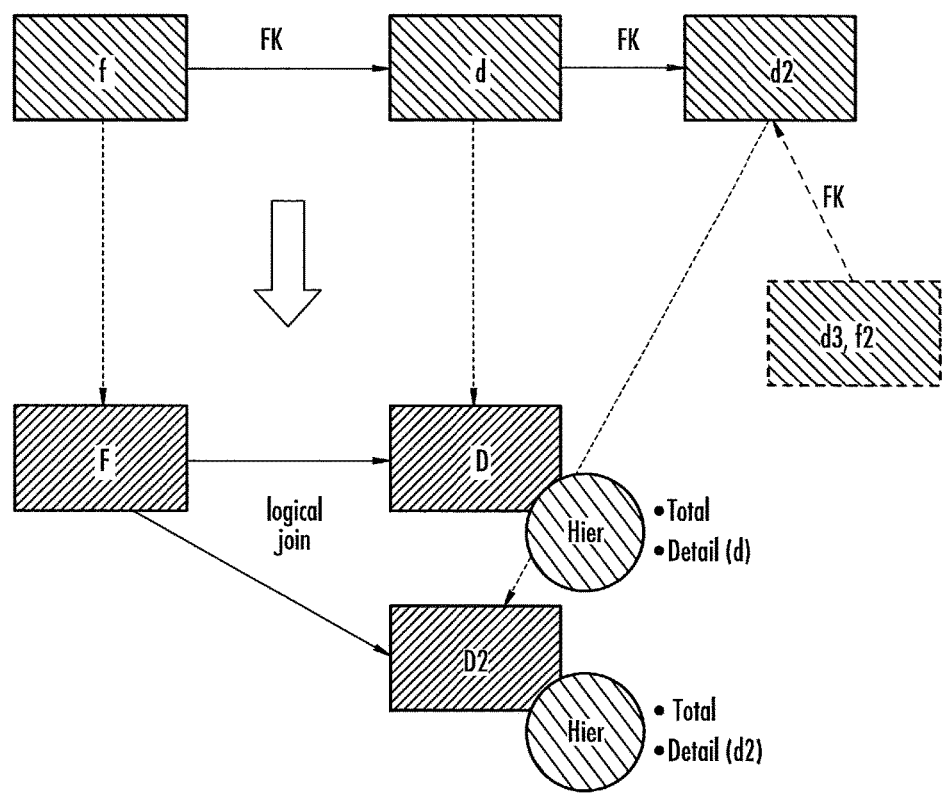
FIG. 11 is a diagram illustrating a shared dimension mapped to a second logical dimension and a mapping to a logical database schema according to an embodiment of the subject matter described herein.

The resulting logical database schema for the dimension referring to a shared outrigger dimension is created by combining tables for dimension d and shared dimension d2 via a join (typically an INNER join; a join that combines dimension tables) to one dataset and mapping the combined tables for dimension tables d and d2 to a single logical dimension table D. A logical hierarchy is created that describes Detail, Shared Level and Total levels. The following variations of levels may also exist:
  no additional level if d and d2 have 1:1 relationship,
  multiple levels if d2 contains embedded hierarchy The following business rules may be used to generate a logical schema for a shared dimension:
Shared table identified
  naming con., e.g. postfix "_D" and
  incoming FK from more than one separate dimension table
  Business name for shared outrigger dimension defined to differentiation w/snowflake
Difference in Hierarchy definition:
  Level is added above Detail and all shared dim columns mapped to it
  Level name derived from Outrigger table business name
Logical Dimension business rules for f→d pattern apply
Variation: One to One Mapping:
  FK name d→d2 could contain postfix "_1-1" to indicate cardinality
  Outrigger columns mapped to Detail level
Variation: Multiple-Level Hierarchy
  Rules same as for dimension with embedded hierarchy or variation with hierarchy table (see later)
  Potential for multiple hierarchies exists According to another aspect, the logical database schema generator may identify a shared outrigger dimension mapped to a second logical dimension. FIG. 11 illustrates such a mapping. In FIG. 11, a physical fact table fact table f has a foreign key relationship to a physical dimension table d, which has a foreign key relationship to a shared physical outrigger dimension table d2. The business name is defined in d's FK column. A shared outrigger dimension mapped to a second logical dimension is an attractive option if d and d2 are different concepts that need to be highlighted.

In FIG. 11, the resulting logic table may be created using the following steps:
  Map d to logical dimension table D.
  Combine tables for dimension d and shared dimension d2 via join (e.g. INNER) to one dataset and map to logical dim table D2. Map only d2 columns into D2
  Logical hierarchy for D2 is created that describes Detail and Total levels.

According to another aspect of the subject matter described herein, the logical database schema generator may identify mini-dimensions physical database schema and map the mini dimensions to corresponding logical database schema. A mini-dimension is a group of dimensional attributes that are separated from a dimension table due to frequency of analysis or frequency of change in the attributes. One example of a mini-dimension includes customer demographic attributes, such as age, purchase frequency, score, and income level, presuming that these columns are used extensively in changes to the attributes are important to the business. Table 1 below is an example of a mini-dimension table for customer demographics:

TABLE 1

| Mini-Dimension Table for Customer Demographics | | | |
| --- | --- | --- | --- |
| Demographics Key | Age Band | Purchase Frequency Score | Income Level |
| 1 | 21-25 | Low | <$30,000 |
| 2 | 21-25 | Medium | <$30,000 |
| 3 | 21-25 | High | <$30,000 |
| 4 | 21-25 | Low | $30,000-39,999 |
| 5 | 21-25 | Medium | $30,000-39,999 |
| 6 | 21-25 | High | $30,000-39,999 |
| ... | ... | ... | ... |
| 142 | 26-30 | Low | <$30,000 |
| 143 | 26-30 | Medium | <$30,000 |
| 144 | 26-30 | High | <$30,000 |
| ... | ... | ... | ... |

Figure 12:
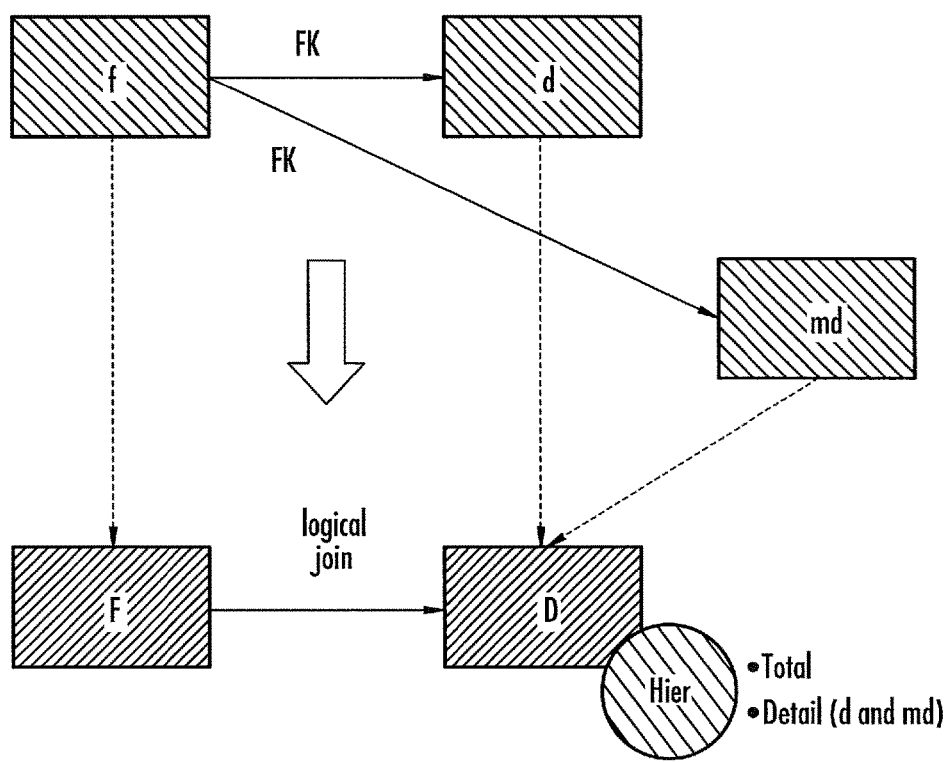
FIG. 12 is a diagram illustrating an example of a mini dimension and a mapping to a logical database schema according to an embodiment of the subject matter described herein.

FIG. 12 illustrates a mini-dimension and the mapping to corresponding logical database schema. In FIG. 12, the physical fact table f has FKs to physical dimension tables d and md. Physical dimension tables d and md are related based on shared name with exception of their postfix. A separate naming convention may be used to identify a mini-dimension. The naming convention may be _MD instead of _D.

In order to generate the corresponding logical database schema, the following steps may be performed:
  Map d and d2 as separate data sources for logical dimension D
  Logical hierarchy is created that describes Detail and Total levels.
  Variations of levels exist (see outrigger)

Figure 13:
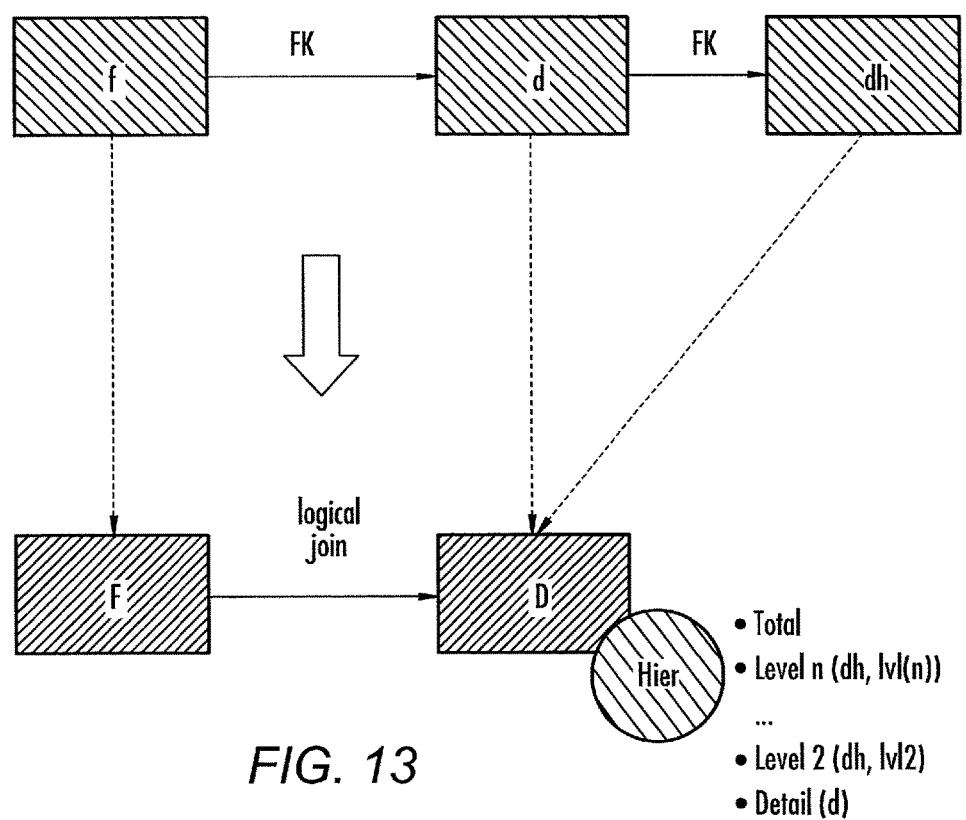
FIG. 13 is a diagram illustrating dimension and hierarchy outrigger tables and their mapping to a logical database schema according to an embodiment of the subject matter described herein.

According to another aspect of the subject matter described herein, the logical database schema generator may identify dimension and hierarchy outrigger tables and generate corresponding logical database schema. A hierarchy outrigger dimension is a dimension that refers to another dimension in a separate dimension table. FIG. 13 illustrates an example of dimension and hierarchy outrigger tables and their mapping to corresponding logical database schema. In FIG. 13, a physical fact table f has a foreign key relationship to dimension table d, which has a foreign key relationship to hierarchy table dh. Hierarchy table dh has multiple level key and description columns. The naming convention to identify levels may be _lvl2, _lvl3, . . . in column names.

The resulting logical database schema can be generated using the following steps:
  Combine dimension d and hierarchy dh tables via join (e.g. INNER join) to one dataset and map to logical dimension table D.
  Logical hierarchy is created that describes Detail and Total levels and all levels contained in hierarchy table dh.

Figure 14:
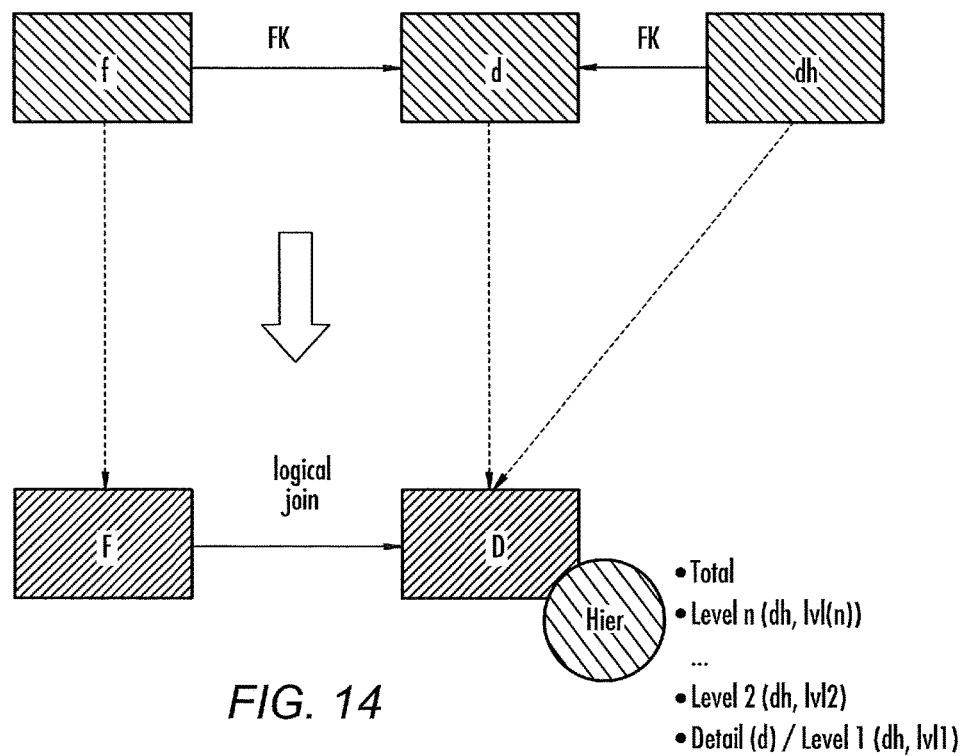
FIG. 14 is a diagram illustrating a dimension table outrigger for multiple hierarchies and a mapping to a logical database schema according to an embodiment of the subject matter described herein.

The following business rules may be used to create the logical database schema illustrated in FIG. 13:
  Identify hierarchy table using the following naming conventions
    naming conv., e.g. postfix "_DH" or
    column names contain "_lvl<k>", k>1
  Generate logical dimension table using the following rules
    Business rules for f→d pattern apply
    Define dataset of inner join between d and dh as table source of logical dimension
    Map columns from joined physical d and dh table to logical fact table F same as for f→d pattern
  Define Hierarchy levels
    Level i attributes (including drill key and drill key description) contain the string "_lvl<i>" in their physical column name Procedure otherwise identical to that used in convention-based definition of dimension with embedded hierarchy pattern Variation is to use Oracle Database Dimension object or explicit external metadata According to another aspect of the subject matter described herein, the logical database schema generator may identify dimension table outrigger for multiple hierarchies. FIG. 14 illustrates an example of a dimension table outrigger for multiple hierarchies and the mapping to the corresponding logical database schema. In FIG. 14, a physical fact table f has a foreign key relationship to a physical dimension table d. A hierarchy outrigger table dh has a foreign key relationship to table d. The dimension outrigger hierarchy table dh has multiple level key and description columns. Naming convention to identify levels, e.g. _lvl1 (same as Detail), _lvl2, . . . .

The resulting logical database schema for the dimension table hierarchy outrigger for multiple hierarchies can be generated using the following steps:

Combine dimension d and hierarchy outrigger dh tables via join (e.g. INNER join) to one dataset and map to logical dimension table D.

Logical hierarchy is created that describes Detail and Total levels and all levels contained in hierarchy outrigger table dh.

Dh level 1 is same as detail defined in d

The following rules may be used to derive hierarchies:

Identify hierarchy table using the following naming conventions:

naming conv., e.g. postfix "_DH" or column names contain "_lvl<k>", k>1

Logical Dimension business rules for f→d→dh pattern apply

Difference in Hierarchy definition:

Level 1 attributes exist in d and dh table and are associated with Detail

The _lvl1 "_CODE" or "_DESC" may not be mapped if redundant with equivalent information in D Variation: Multiple Hierarchies dh table contains column that is used to differentiate between hierarchies, e.g. "hierarchy_name"

Hierarchy name column must be available in logical dimension and for each hierarchy identified by a value in the "hierarchy_name" column, a top level with hierarchy name is inserted below the Grand Total level and atop the remainder of the hierarchy.

The hierarchies may have different number of levels reflecting the differences in organization. The details must be provided by additional metadata provided through external text files or an Oracle database dimension object.

Figure 15:
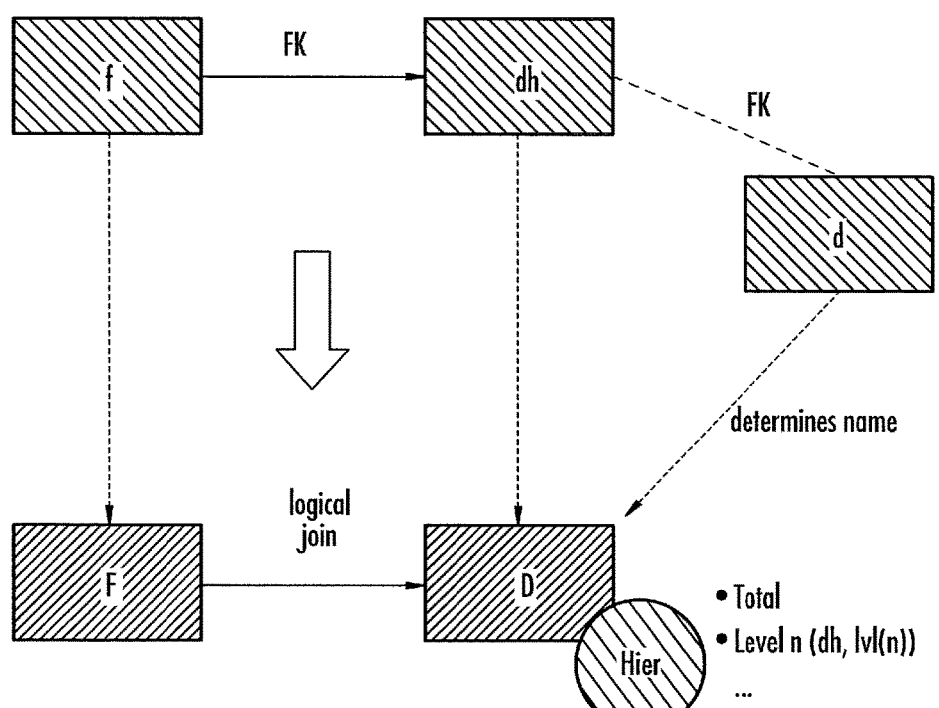
FIG. 15 is a diagram illustrating a fact that refers to a higher dimension level and a mapping to a logical database schema according to an embodiment of the subject matter described herein.

According to another aspect of the subject matter described herein, the logical database schema generator may be used to identify a fact that refers to a higher dimension level and generate corresponding logical database schema. In FIG. 15, a physical fact table f has a foreign key relationship to hierarchy outrigger table dh; dh has a foreign key relationship from or to dimension table d. The foreign key name may contain reference to target level (e.g. "_lvl3".) The dimension hierarchy outrigger dh has multiple level key and description columns. Naming conventions used to identify levels may include. _lvl2, _lvl3, . . . in column names.

The resulting logical database schema for the fact that refers to a higher dimension level may be generated using the following steps:

similar to f→d→dh pattern; implies that d table is referenced from another fact table dh table must be mapped to logical dimension D The following business rules for may be used for deriving dimensions:

Identify physical hierarchy table using the following rules:

Naming conv., e.g. postfix "_DH" or

Column names contain "lvl<i>", i>1

Determine Target Level

Target level identified T by including substring lvl<i> into FK name

Logical Fact

Set Aggregation level T for table source dh of logical dimension D

Figure 16:
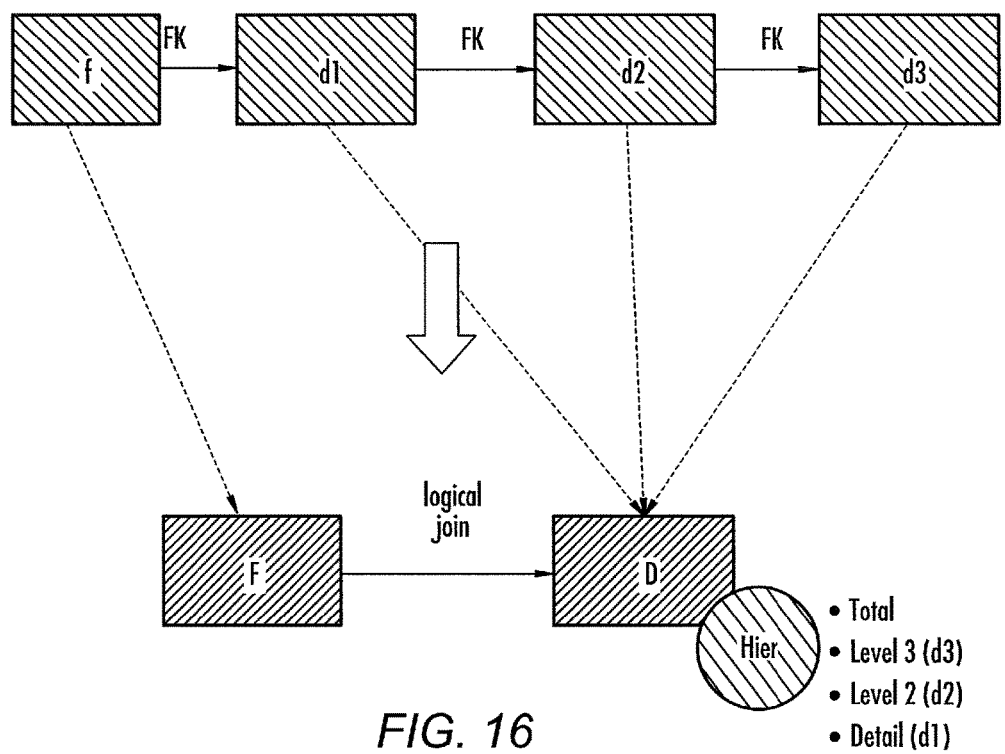
FIG. 16 is a diagram illustrating a snowflake dimension and a mapping to a logical database schema according to an embodiment of the subject matter described herein.

According to another aspect of the subject matter described herein, the logical database schema generator may be used, to identify snowflake dimensions and generate corresponding logical database schema. A snowflake dimension is a dimension that forms a link in a chain of more than two dimensions from a fact table. For example, a snowflake dimension for a product dimension may include product, brand, category, and department. FIG. 16 illustrates a snowflake dimension and the mapping to the corresponding logical database schema. In FIG. 16, physical fact table contains foreign key relationship to a sequence of snowflake dimension tables with FK relationships.

The resulting logical database table can be generated using the following steps:

Physical fact table is mapped to logical fact table; physical dimension tables d1-d3 are mapped to logical dimension table D Combine snowflake dimension tables via joins (e.g. INNER joins) to one dataset Logical hierarchy is created that describes 3 levels plus the Total level. D1 represents Detail level and D2 and D3 define levels above.

The following business rules can be used to derive hierarchies for the snowflake dimension:

Logical Dimension

Business rules for f→d pattern apply

Table source of D defined as inner join between tables d1, d2 and d3

Map columns from dataset defined through join of tables d1, d2 and d3 to logical fact table as for F→D pattern Define Hierarchy levels Similar to f→d and f→d→dh patterns Default assumption is that each d<i> table represents one level in hierarchy Name of logical level 'i' derived from D<i> table Drill key are SK/PK of tables d<i>

Variation is to use Oracle database Dimension object or explicit external metadata The following business rules may be used to define hierarchies for shrunken dimensions and multiple hierarchies:

Variation: Shrunken Dimensions

Other fact may refer to d2 or d3 implying shrunken dimensions d2→d3 and d3

Add alias for (d2 join d3) and d3 to Logical dimension with aggregation level 2 and 3, respectively Variation: Multiple Hierarchies
    Additional 'branches' off one or multiple of dimension tables d<i>
        For example d1→d4→d5→d6 creates an alternative hierarchy
        Add data source of D for additional hierarchy defined by a dataset joining (e.g. INNER) all physical dimension tables from Detail level (d1) to hierarchy root
        For each additional hierarchy table, add levels into D's dimension and organize in separate hierarchy according to the relationships of the underlying dimension tables.

Figure 17:
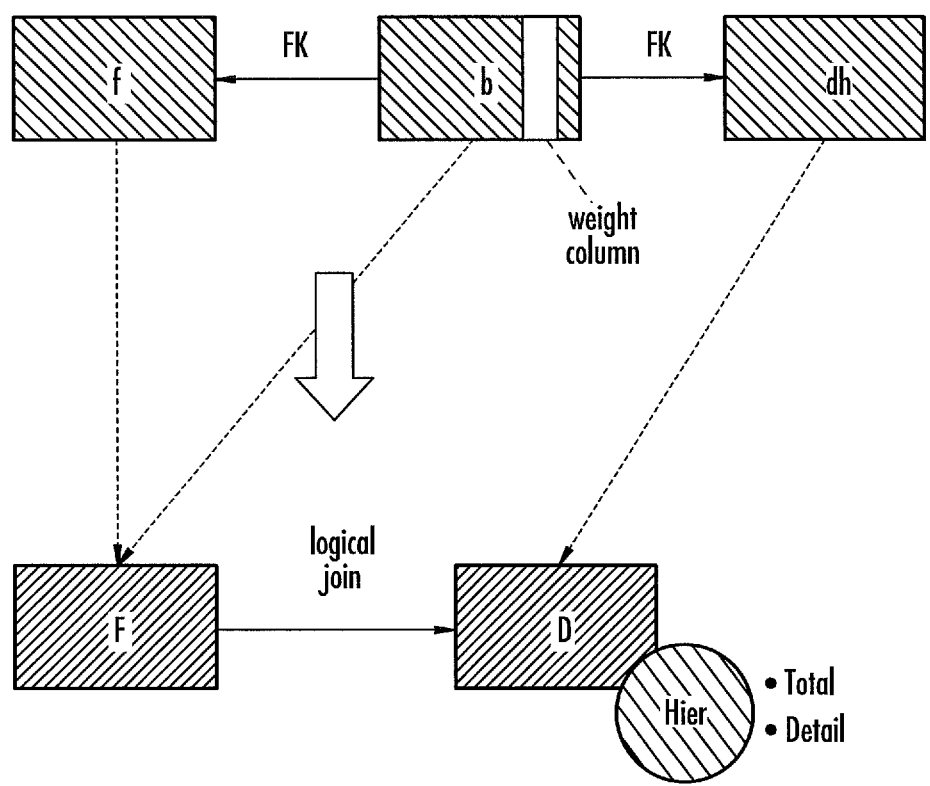
FIG. 17 is a diagram illustrating a multi-valued dimension using a bridge table and a mapping to a logical database schema according to an embodiment of the subject matter described herein.

According to another aspect of the subject matter described herein, the logical database schema generator may identify multi-valued dimensions using a bridge table and generate the corresponding logical database schema. FIG. 17 illustrates a multi-valued dimension using a bridge table and the mapping to the corresponding logical database schema. In FIG. 17, a physical bridge table b has a foreign key relationship to fact table f, which has a foreign key relationship to dimension table d. Bridge table b has a weight column that sums to 1.0 for rows with same group SK in b.

Figure 18:
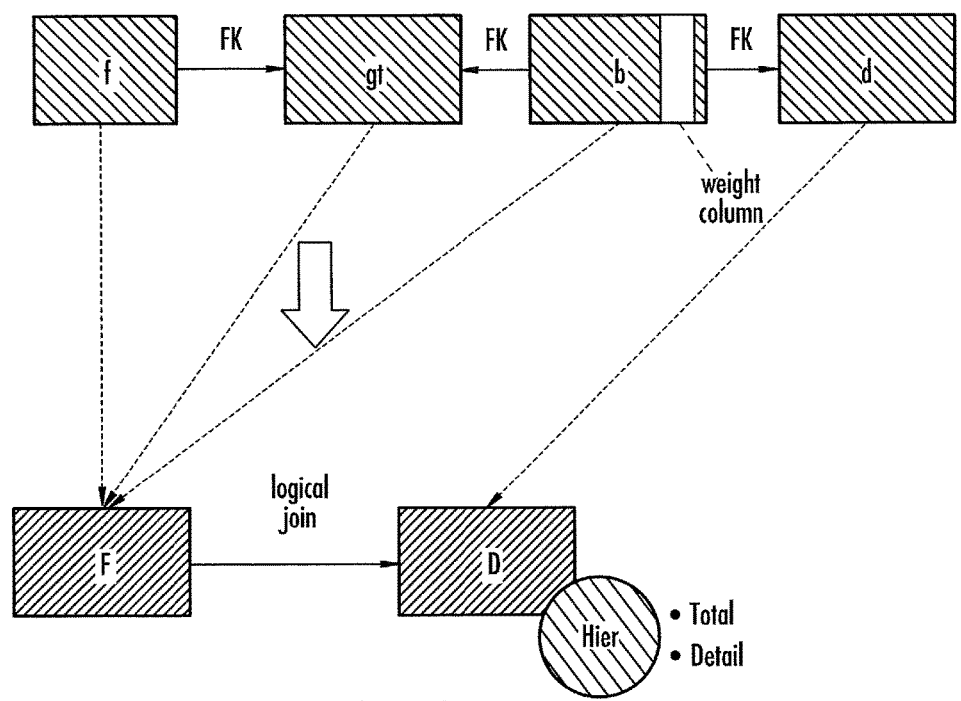
FIG. 18 is a diagram illustrating a multi-valued dimension using group bridge tables and a mapping to a logical database schema according to an embodiment of the subject matter described herein.

The resulting logical database schema for the multi-valued dimension using a bridge table can be generated using the following steps:
    Combine physical fact f and bridge b tables via join (e.g. INNER) to one dataset and map to logical fact table F.
    Measures identified in fact must be multiplied with weight column of bridge b table in case that dimension D attributes are used as filter criteria The following business rules may be used to derive a multi-valued dimension:
    Identify bridge table using the following rules:
        naming convention, e.g. posffix "_B" or
        outgoing FK relationships to one fact and one dimension table and weight column exists
    Logical Fact business rules for f→d pattern apply
    Differences in definition:
        Define dataset of join (e.g. INNER join) between d and b as table source of logical fact F
        b's weight column only mapped to logical column if business need exists
        Add definition of measures in f that include the bridge table b's weight value
        Weight columns need to consider the case that they are "1" because the dimension is rolled up to Total level
        F may have more than one bridge to represent multiple multi-valued dimensions; weight factors multiplied According to another aspect of the subject matter described herein, the logical database schema generator may identify multi-valued dimensions using group bridge tables and generate the corresponding logical database schema. FIG. 18 illustrates an example of a multi-valued dimension using group bridge tables and the mapping to the corresponding logical database schema. In FIG. 18, a physical fact table f has FK to group table gt, bridge table b has FK to gt and b has FK to dimension table d. Bridge table b has weight column that sum to 1.0 for a group with same group SK in b.

Figure 19:
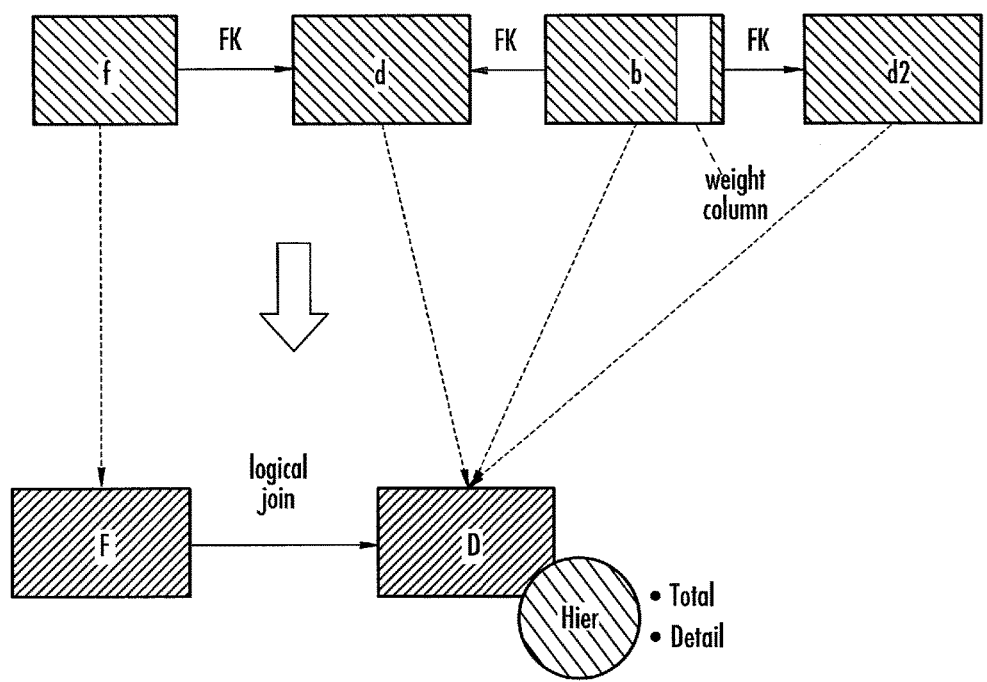
FIG. 19 is a diagram illustrating a bridge between the dimensions and a mapping to a logical database schema according to an embodiment of the subject matter described herein.

The resulting logical database schema for the multi-valued dimension table using group bridge tables can be generated using the following steps:
    Combine physical fact f, group table and bridge b tables via joins (e.g. INNER joins) to one dataset and map to logical fact table F.
    Measures identified in fact must be multiplied with weight column of bridge b table in case that dimension D attributes are used as filter criteria According to another aspect of the subject matter described herein, the logical database schema generator may identify bridges between dimensions and generate the corresponding logical database schema. FIG. 19 illustrates an exemplary bridge between dimensions and mapping to corresponding logical database schema. In FIG. 19, a physical fact table f has a foreign key relationship dimension table d, bridge table b has a foreign key relationship to d and second dimension table d2.

Figure 20:
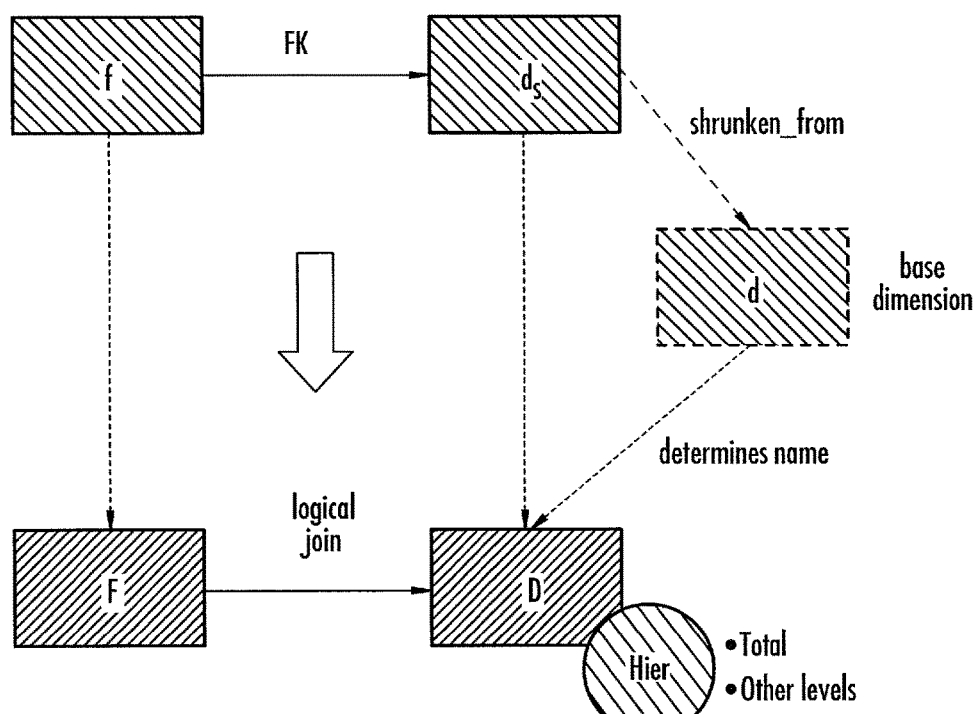
FIG. 20 is a diagram illustrating a shrunken dimension table and a mapping to a logical database schema according to an embodiment of the subject matter described herein.

The corresponding logical database schema can be generated using the following steps:
    Physical fact f is mapped to logical fact F.
    Dimension table d is mapped to logical dimension table D and dataset consisting of join (e.g. INNER join) between bridge table b and dimension table d2 is mapped to D According to another aspect of the subject matter described herein, a logical database schema generator may be used to identify a shrunken dimension table and generate the corresponding logical database schema. A shrunken dimension is a dimension that is a subset of the rows or columns of a base dimension. For example, a product brand dimension that includes brand, subcategory, category, and department attributes is a shrunken dimension of a product dimension, provided that the brand dimension and all of its attributes are attributes of the product dimension. FIG. 20 illustrates an example of a shrunken dimension table and the mapping to a corresponding logical database schema. In FIG. 20, a physical fact table f has foreign key relationship to dimension table $d_s$, which is shrunken dimension of base dimension table d. A shrunken dimension implies that base dimension contains an embedded hierarchy.

The logical schema corresponding to the shrunken dimension table can be generated using the following steps:
    Physical table f is mapped to logical fact table F and physical shrunken dimension table $d_s$ is mapped to logical dimension table D, to which base dimension d is mapped as well
    Lowest level of shrunken dimension is between D's Detail and Total levels The following business rules may be used to identify shrunken dimensions:
    Shrunken dimension identified
        Identified as dimension and
        table $d_s$ columns are subset of base dimension table d
        Implies that shrunken dimension represents higher levels of base dimension's embedded hierarchy
        Hierarchy metadata defined for base dimension sufficient to map
    Set Levels at mapped fact f in F and of dimension source d of D according to the determined level
    Opportunity
        In case schema defines shrunken dimensions for each level, all hierarchy levels may be derived automatically
    Variation: Multiple Hierarchies
        Same business rules as for full dimension
        More opportunity to identify levels and alternative hierarchies
        Example: Oracle Business Intelligence Applications (OBIA) calendar dimensions and associated shrunken dimensions
    Possible Issue: determine intended role-playing shrunken dimension f1 refers to dimension d at lowest level and f2 at a level above. f1 and f2 do not have "aggregate_of" relationship To ensure that logical F1 and F2 refer to same logical role-playing dimension D, business name in FK column referring to d in f1 and f2 must use the business name used in f2.

Not needed if f2 is aggregate of f1

Figure 21:
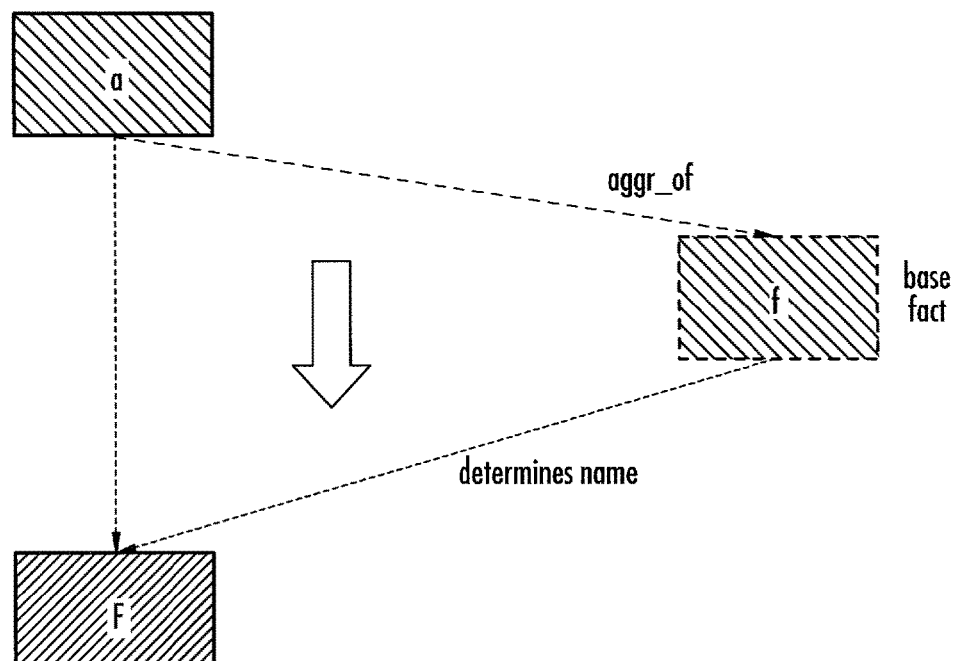
FIG. 21 is a diagram illustrating an aggregation table and a mapping to a logical database schema according to an embodiment of the subject matter described herein.

According to another aspect of the subject matter described herein, the logical database schema generator may identify aggregation tables and generate the corresponding logical database schema. FIG. 21 illustrates an aggregation table and the mapping to corresponding logical database schema. In FIG. 21, a physical aggregation table is an aggregate table of fact table f.

The logical database schema corresponding to the aggregation table may be generated using the following steps:

Physical aggregation table 'a' is mapped to logical fact table

Columns identified in fact f as measures are mapped to logical measure columns

Grain of table 'a' is reflected by mapping it to higher dimension levels of associated dimension when compared to fact table f.

The corresponding business rules may be used to identify an aggregation table:

Identify aggregation table using the following rules:
naming convention, e.g. postfix "_A"
business rules to identify fact tables apply and
FK table columns are a subset of fact table f and measure columns are same and
FK of aggregate table 'a' may refer to same dimension table d as f, the dh table of d or a shrunken dimension of d
Optionally: (business) name of f and 'a' may be similar, e.g. identical prefix Although many different patterns and the mapping to corresponding logical database schema have been described, the subject matter described herein is not limited to the mappings or patterns described above. Additional patterns may be added without departing from the scope of the invention. Some additional patterns that are intended to be within the scope of the subject matter described herein include:

Dimension with level-based ragged or skip-level hierarchies

Dimension with parent-child hierarchies in self-referencing dimension table and closure table Dimensions for 'as-is' and 'as-was' reporting in context of SCD type 1 or 2 columns in dimension tables Group Tables (specific form of outrigger dimension)

I18N lookup tables for level names

Figure 22:
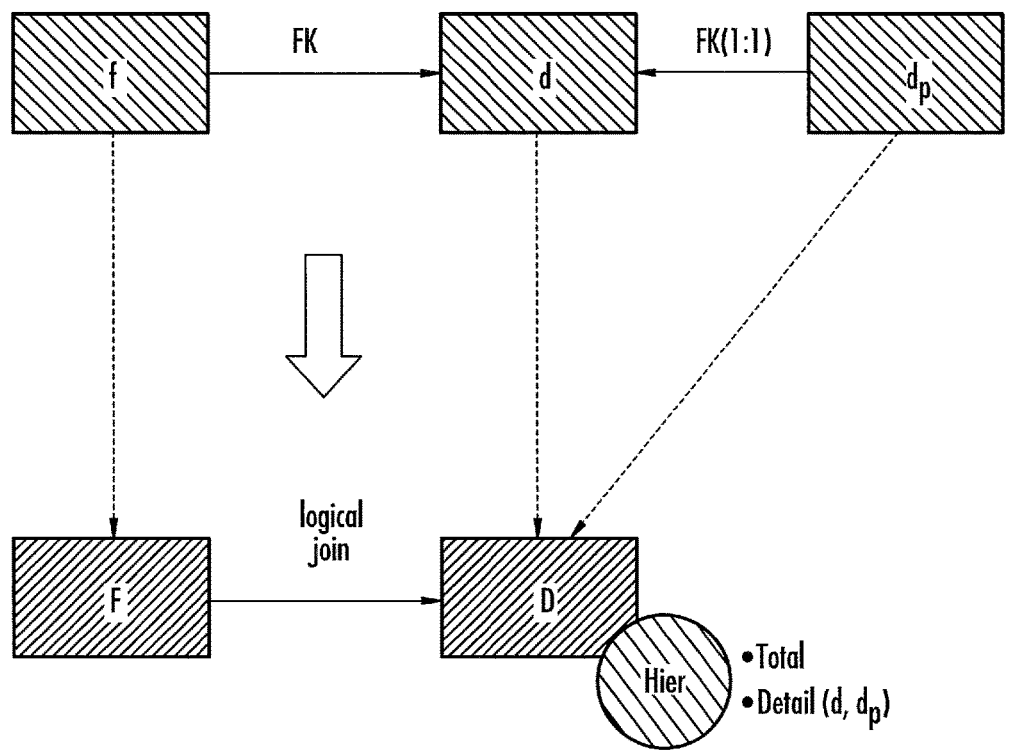
FIG. 22 is a diagram illustrating dimension customization without impact on existing tables according to an embodiment of the subject matter described herein.

According to another aspect, the subject matter described herein may support customization of existing patterns without an impact on existing tables. FIG. 22 illustrates dimension customization without an impact on existing tables that may be performed by the logical database schema generator. In FIG. 22, physical fact table f has FK to dimension table d; peer table $d_p$ has FK with 1:1 cardinality to shared dim table d. Peer table relationship between d and $d_p$ may be reinforced using similar naming conventions; possible new "_XD" extension vs. "_D".

The resulting logical table can be created using the following steps:
Combine tables for dimension d and peer dimension $d_p$ via join (e.g. INNER join) to one dataset and map to logical dim table D. Map columns of d and $d_p$ to D. Columns map to logical level Detail.

Logical hierarchy for D is created that describes Detail and Total levels.

According to another aspect, the subject matter described herein may allow fact extension without an impact on existing tables.

Peer facts must not be introduced.
Joins between facts are to be avoided due to negative performance implications.
Instead, add new fact with same dimensionality as the fact to be extended
use same FK columns and business names to ensure use of same logical dimensions
allows cross-drilling queries (efficient compared to joins between facts).

The following is a high level description of exemplary functionality of logical database schema generator as described herein. Each of these steps will be described in detail with respect to FIG. 24-34.

Sequencing of Schema Analysis and Generation

Figure 23:
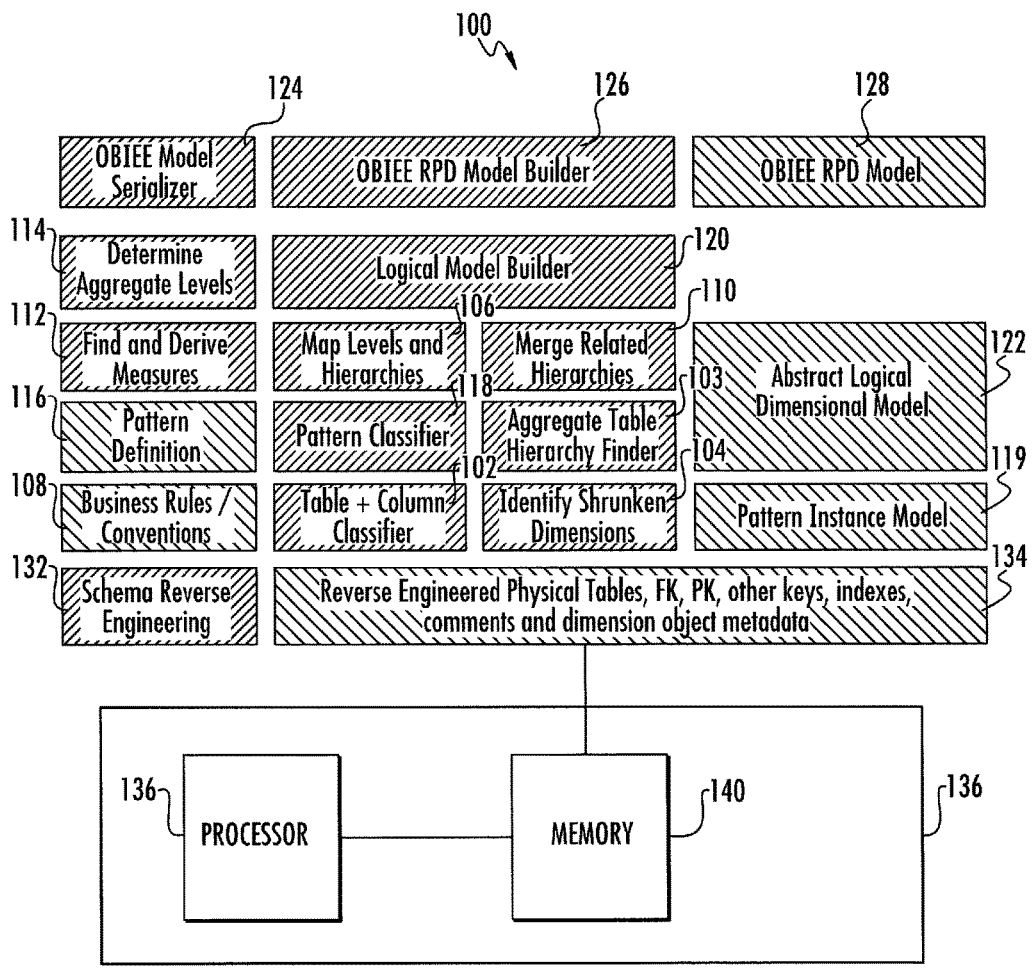
FIG. 23 is a block diagram illustrating exemplary components of a logical database schema generator according to an embodiment of the subject matter described herein.

1. Classify tables into fact, aggregate, dimension, mini-dimension, hierarchy, or bridge etc.; determine calendar and time dimensions
2. Determine fact and aggregate table aggregation hierarchies (aggr_of rel.) and shrunken dimension hierarchies (shrunken_from relationship)
3. Determine dimension/mini-dimension and dimension/peer dimension relationships using naming conventions
4. Perform basic validation on physical tables and associated metadata, e.g.:
   Type consistency; e.g. bridge table must have a weight column.
   Mini-dimensions only used if its dimension is used by fact as well.
   Consistent use of business names in table or column comments; e.g. no duplicate names in columns of same table.
5. Determine patterns starting from fact tables and subsequently from aggregate tables along aggr_of relationships
   Create structural logical fact definitions using patterns related to fact, aggregate and bridge tables; maintain pattern information
   Create initial structural logical dimension definitions based on patterns; this includes decisions to embed tables in one or multiple logical dimensions
   Determine degenerated dimensions and its logical equivalent
   Continuously merge logical dimensions in case of hierarchy-related sub-patterns
   Include shrunken dimensions into logical dimensions
   Determine logical dependencies between logical facts and logical dimensions maintain patterns information in logical structures
6. Determine levels in dimensions, level names, drill keys and attributes assigned to levels and hierarchies
   Use dimension descriptor (e.g. Oracle dimension object)
   Use shrunken_from relationship to derive initial levels (e.g. OBIA Calendar dims) and hierarchies
   Determine levels (e.g. D→DH, D←DH and snowflake pattern) and hierarchies using table structures
   Use naming and other conventions to determine levels, level names, drill keys and level attributes within physical tables 7. Determine aggregation level for physical tables in logical fact
    Use FK to physical dimension table and its associated level + FK naming conventions
8. Determine measures in logical fact tables
    Use conventions (column type and name) to determine base facts
    Determine aggregate method using default, column naming conventions, text analysis of business rules or explicit override
    Add a synthetic measure "1" for factless fact tables and use SUM aggregate rule
9. Add derived measures using external definitions that are merged into logical fact table
10. Finalize Logical Tables
    Create Role Playing dimensions
    Derive business names and descriptions for logical tables and columns; use physical table and column comments or derive names using other means (e.g. use plug-ins)
11. Translate logical star model into specific BI tool model
    For OBIEE, use XUDML or MDS XML API models or proprietary RPD model (RPD is the file in OBIEE that stores the metadata and rules for creating and presenting logical database schema)
12. Serialize and generate models for targeted BI tool
    For OBIEE, generate XUDML or MDS XML and subsequently use BI tool "biserverxmlexec" or use internal OBIEE infrastructure to directly generate RPD FIG. 23 is a block diagram of an exemplary high level architecture for a logical database schema generator as described herein. In FIG. 23, logical database schema generator 100 includes a table and column classifier 102 for identifying table types using the steps described above. A shrunken dimension module 104 identifies shrunken dimensions relationships between tables. An aggregate table hierarchy finder module 103 determines the aggregation relationship of fact tables and their aggregate tables using business rules 108. A hierarchy levels mapping module 106 determines levels and hierarchies using business rules and conventions 108, shrunken dimension relationships and external information (e.g. from Oracle database Dimension objects). A related hierarchies merge module 110 consolidates dimension tables into logical groups exploiting shrunken relationship associations and patterns and merges associated hierarchies. A measures module 112 locates and derives measures from physical fact tables. An aggregation level determination module 114 determines aggregation levels of associated aggregation tables based on FK relationship, shrunken dimension relationships and metadata provided through FK naming conventions. A pattern definition module 116 stores pattern definitions used by pattern classifier 118 to identify patterns in physical database schema. A pattern instance module 119 stores instances of identified patterns. A logical model builder 120 oversees the overall generation of logical database schema. An abstract logical dimensional module 122 stores the identified logical database schema. An OBIEE model serializer 124 and OBIEE RPD model builder 126 generate the final OBIEE RPD model 128. A schema reverse engineering module 132 performs reverse engineering of physical tables, keys, and other physical dimensional metadata.

The logical database schema generator 100 illustrated in FIG. 23 may be implemented by a computer 136 including a processor 138 and associated memory 140. In particular, logical database schema generator 100 may be a computer program executed by processor 138 or implemented as a combination of hardware, firmware, and/or software. Logical database schema generator 100 improves the functionality of computer 136 by making queries to data stored in a data warehouse more efficient and simplifying presentation of such data to a user. Logical database schema generator 100 also advances the technical fields of database management and data warehousing these same reasons.

Figure 24:
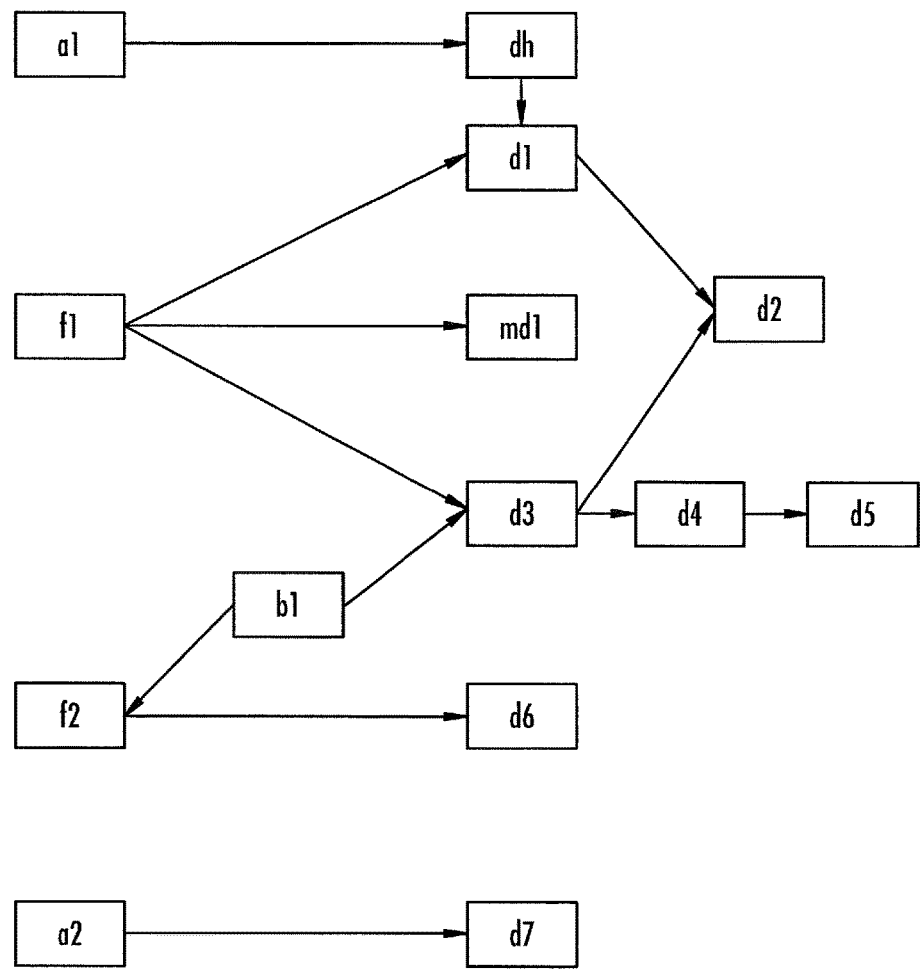
FIG. 24 is a diagram illustrating the identification of physical table types according to an embodiment of the subject matter described herein.

FIG. 24 is a diagram illustrating the identification of physical table types according to an embodiment of the subject matter described herein. The table types may be identified by table and column classifier 102 using the rules described above. The types of tables that may be identified include fact tables, aggregate tables, dimension tables, mini dimension tables, hierarchy tables, and bridge tables.

Figure 25:
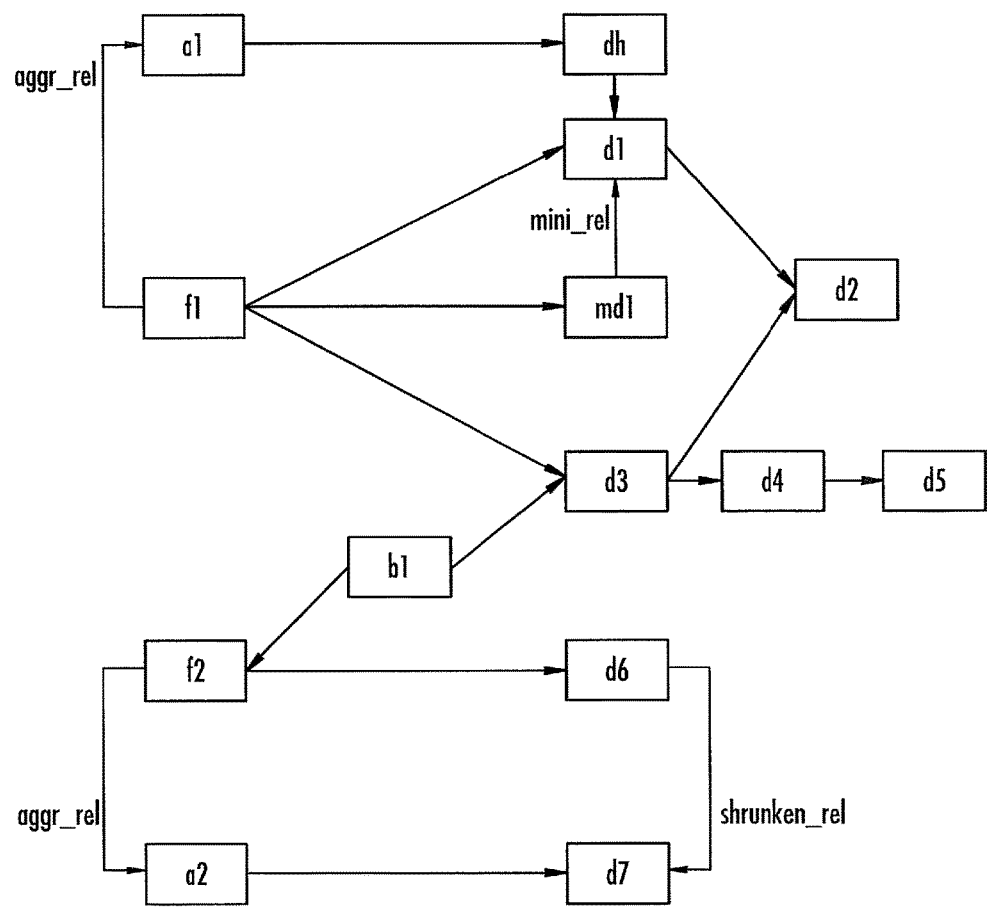
FIG. 25 is a diagram illustrating the identification of relationships between table types according to an embodiment of the subject matter described herein.

FIG. 25 is a diagram illustrating the identification of relationships between table types according to an embodiment of the subject matter described herein. The relationships can be identified by shrunken dimensions identification module 104 and aggregate table hierarchy finder 103 using business rules and conventions 108.

Figure 26:
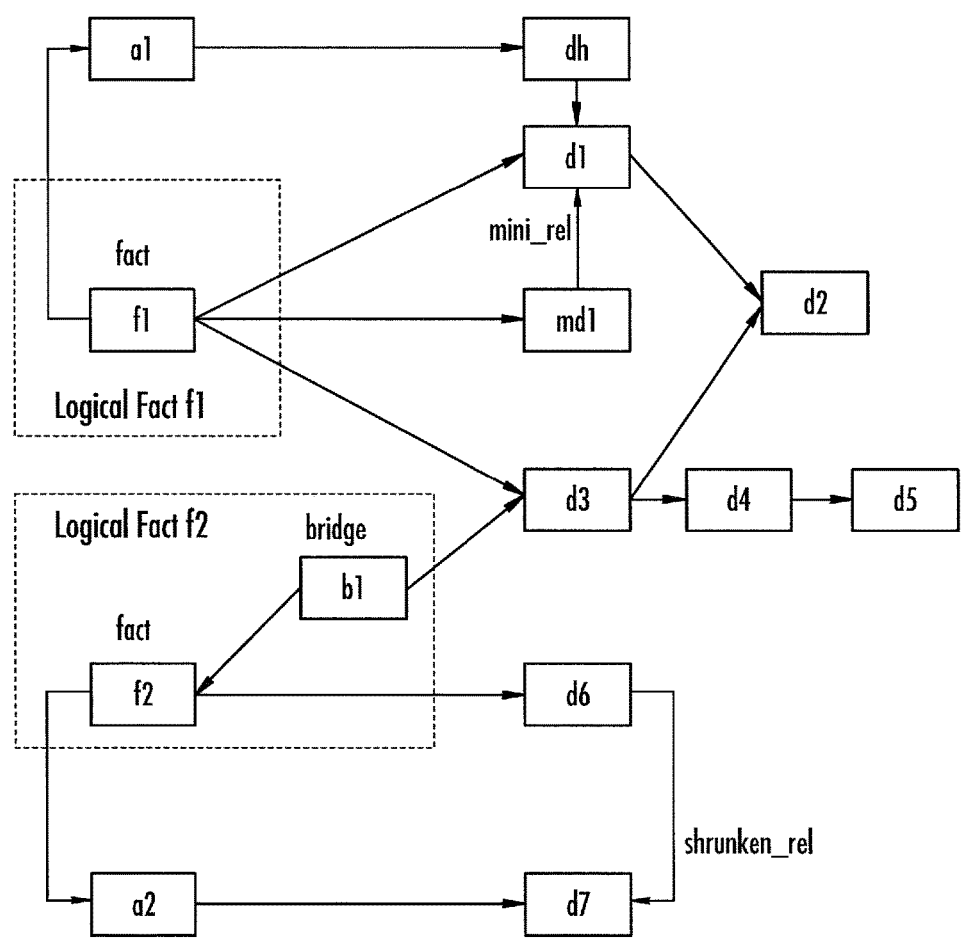
FIG. 26 is a diagram illustrating the classification of fact and bridge tables into logical groups.

FIG. 26 is a diagram illustrating the classification of fact and bridge tables into logical fact groups. A logical fact at this point consists of a fact table or a fact and associated bridge table. Pattern structure and pattern names are maintained for future analysis. This step may be performed by related pattern classifier module 118 and logical model builder module 120 illustrated in FIG. 23.

Figure 27:
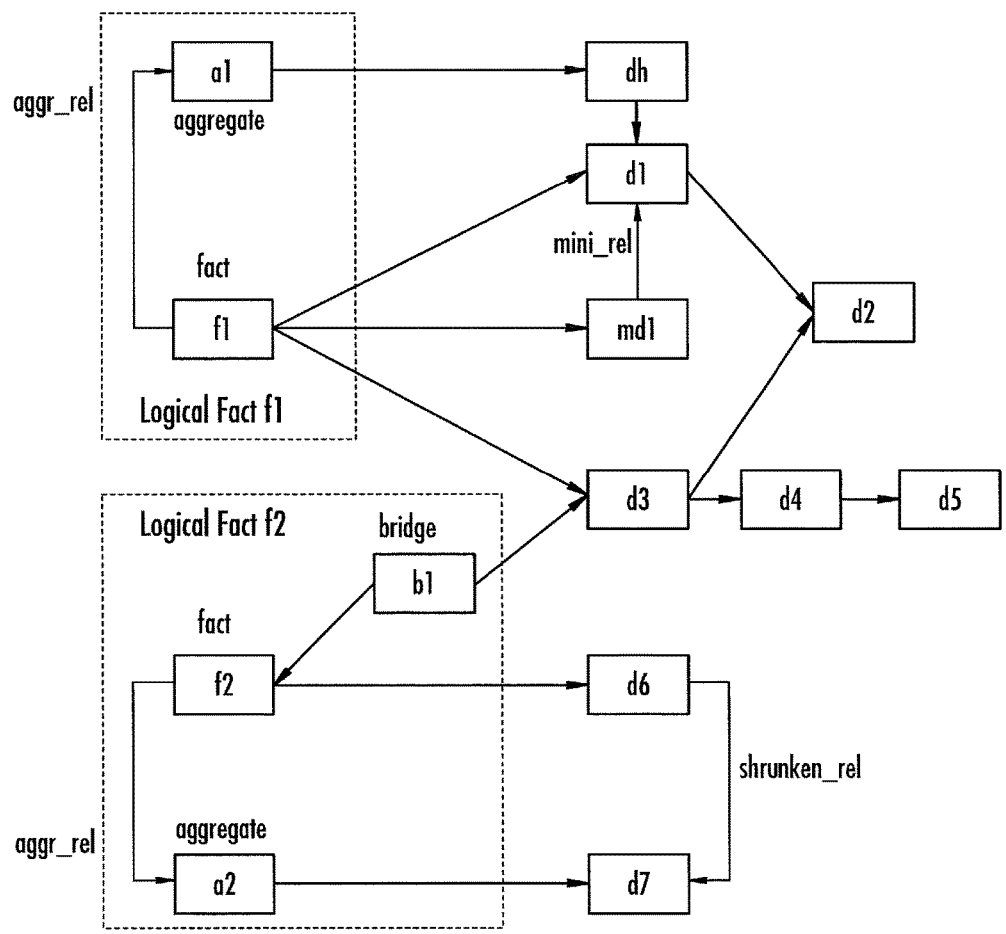
FIG. 27 illustrates the association of aggregate tables into logical fact groups according to an embodiment of the subject matter described herein.

FIG. 27 illustrates the association of aggregate tables into logical fact groups according to an embodiment of the subject matter described herein. In FIG. 27, aggregates are incorporated into a common logical fact table. Aggregate tables and facts require hierarch level information to be provided at a later phase. The associations illustrated in FIG. 27 may be performed by related model builder module 120 illustrated in FIG. 23

Figure 28:
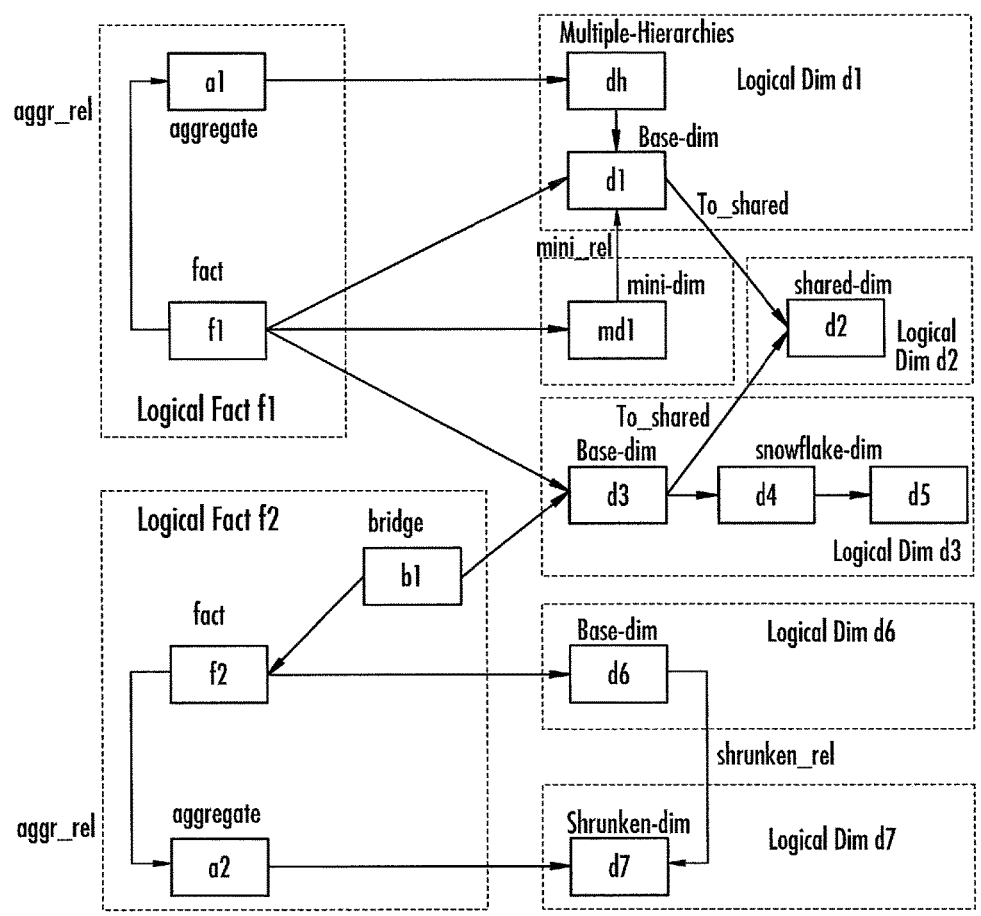
FIG. 28 is a diagram illustrating the classification of dimension tables and the association with logical groups according to an embodiment of the subject matter described herein.

FIG. 28 is a diagram illustrating the classification of dimension tables and the association with logical groups according to an embodiment of the subject matter described herein. In FIG. 28, dimension tables are classified starting from FK relationships originating from fact, bridge, or aggregate tables using pattern classifier module 118 and logical model builder module 120 illustrated in FIG. 23. Logical tables are merged during incremental classification. Hierarchy tables may be identified from one fact before its base dimension is identified from another fact. Reclassification of a table may be necessary if a shared dimension pattern is detected after it was identified as a base dimension. Special treatment for degenerated dimensions may be required.

Figure 29:
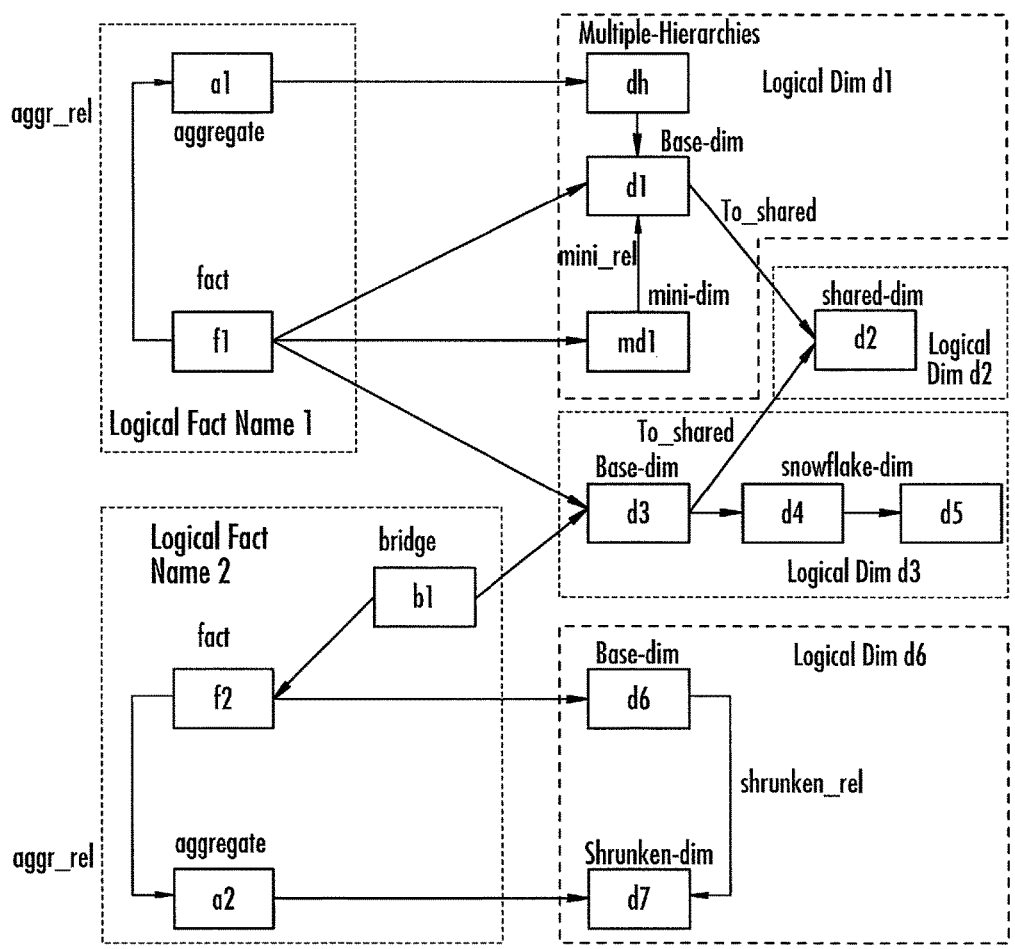
FIG. 29 is a diagram illustrating the consolidation of mini- and shrunken dimension groups according to an embodiment of the subject matter described herein.

FIG. 29 is a diagram illustrating the consolidation of mini- and shrunken dimension groups according to an embodiment of the subject matter described herein. In FIG. 29, logical fact and dimension groupings closely reflect the RPD logical tables. A shared dimension pattern implies that a physical table can be part of multiple logical RPD tables, including a separate logical RPD dimension. The steps illustrated in FIG. 29 may be performed by logical model builder 120 using relationships created by shrunken dimensions identifier 104 illustrated in FIG. 23.

Figure 30:
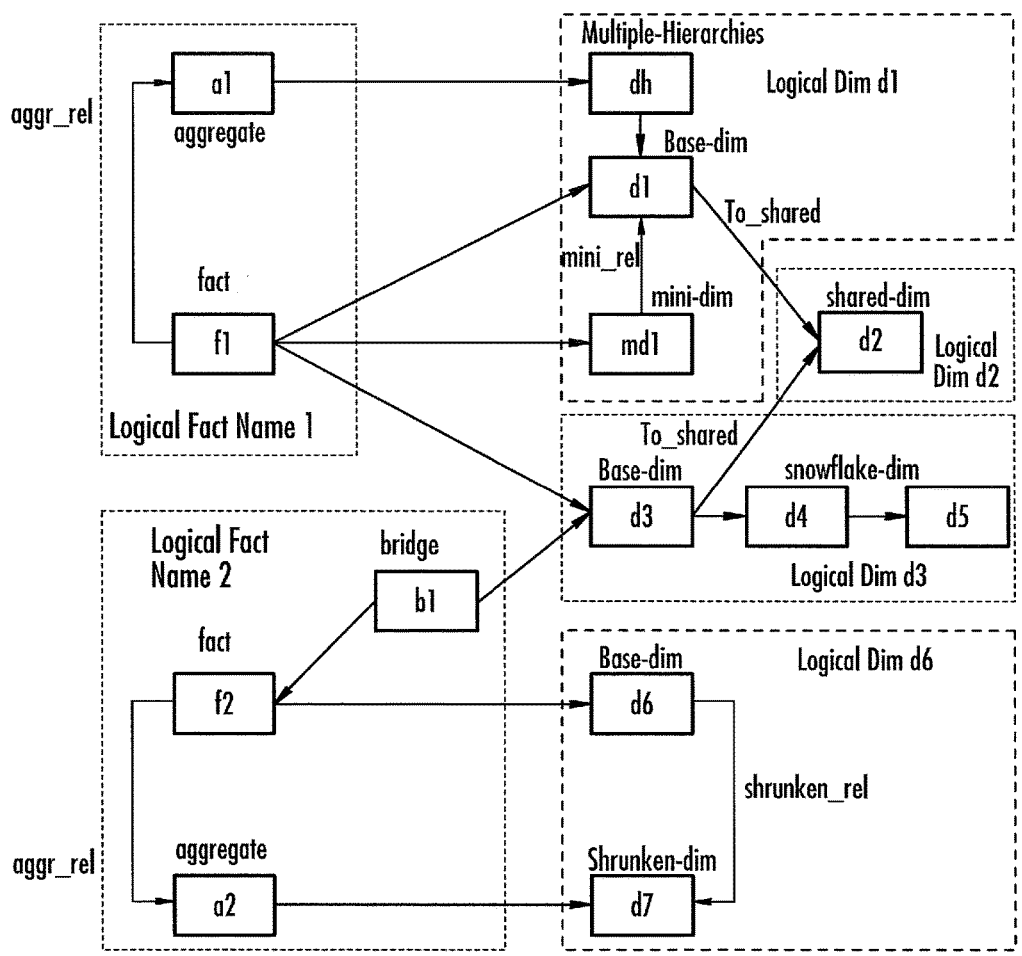
FIG. 30 is a diagram illustrating the determination of business names for logical fact tables and the identification of columns with business relevance according to an embodiment of the subject matter described herein.

FIG. 30 is a diagram illustrating the determination of business names for logical fact tables and the identification of columns with business relevance according to an embodiment of the subject matter described herein. In FIG. 30, business names are determined for logical fact tables. Role playing may delay the naming of dimension tables. Columns with business relevance may be determined using schema metadata and naming conventions. In the identification of column names with business relationships, technical columns, such as keys, FK columns, and ETL-related metadata may be excluded. The identification of columns with business relevance may be performed by logical model builder 120 using business rules and conventions module 108 illustrated in FIG. 23.

In FIG. 30, another operation that is performed is the determination of business names for all business columns in all tables and the business names may be mapped to logical column definitions. For example, the name for a column in a physical fact table may be non-business names, such as Dol_Sales_Amt for "Dollar Sales Amount". Such names may be mapped to the corresponding business name "Dollar Sales Amount" using comments stored for table columns.

Yet another operation that may be performed in FIG. 30 is the determination of technical columns that are required in a logical model depending on the logical table type (e.g. PK column typically mapped in dimension table). In an extension to the steps illustrated in FIG. 30, a plug-in may be provided that allows the user to customize table naming and mapping.

Figure 31:
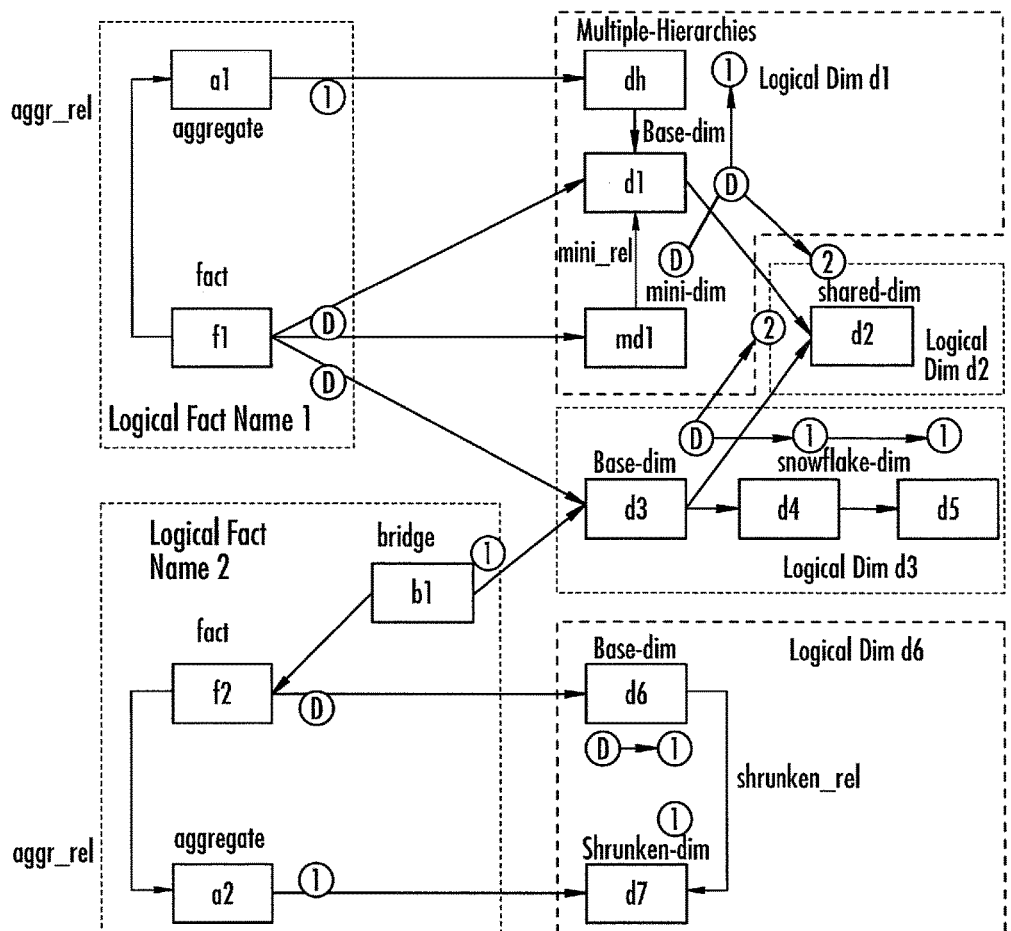
FIG. 31 is a diagram illustrating the derivation of logical hierarchies and hierarchy levels according to an embodiment of the subject matter described herein.

FIG. 31 is a diagram illustrating the derivation of logical hierarchies and hierarchy levels according to an embodiment of the subject matter described herein. In FIG. 31, levels and hierarchies may be derived using naming conventions for DH tables and other dimension tables. FK relationships from base to other dimension tables may be used to identify alternative hierarchies and levels. Shrunken dimension relationships may be used to identify alternative hierarchies and levels. Mini-dimension relationship may be used to identify additional attributes associated with each Detail level. Level names may be derived using available business names. Drill keys and other keys may be derived. Such classification enables the determination of which logical level fact/aggregate or dimension tables are associated with each other. This step may be performed by map levels and hierarchies module 106 using business rules and conventions module 108 and relationships created by aggregate table hierarchy finder module 103 and shrunken dimension identifier module 104 illustrated in FIG. 23. An extension to the capabilities illustrated in FIG. 31 may include a plug-in to customize hierarchy, level, naming and drill keys.

Figure 32:
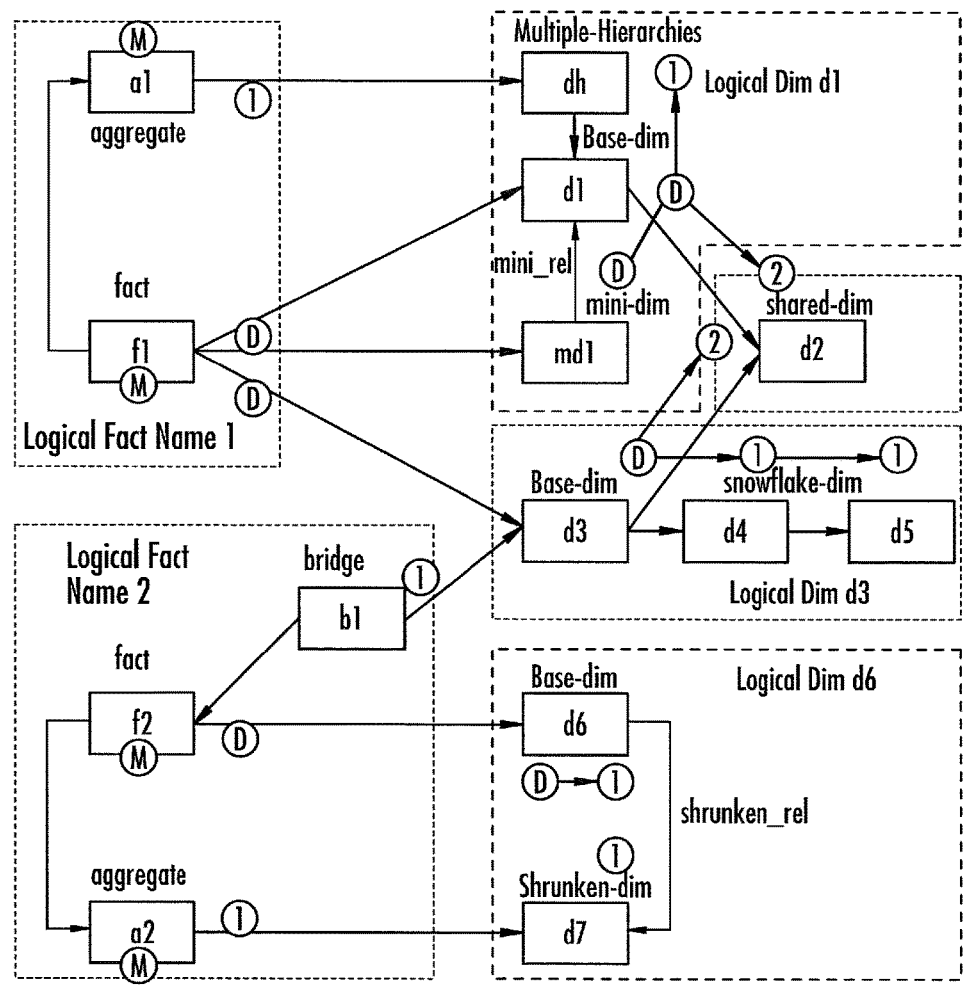
FIG. 32 is a diagram illustrating the identification and derivation of measures according to an embodiment of the subject matter described herein.

FIG. 32 is a diagram illustrating the identification and derivation of measures according to an embodiment of the subject matter described herein. In FIG. 32, fact table columns that represent measures are identified. An aggregation rule that represents each column is identified. The default aggregation rule is SUM, indicating that the measures in each column will be summed. Naming conventions for each column or business name may be used to determine alternate aggregation rules. Externally defined measures for each fact table may be merged. The same derived measures may be applied to related aggregate tables. This step may be performed by find and derive measure module 112 using business rules and conventions module 108 illustrated in FIG. 23. An extension to the operations illustrated in FIG. 32 may include a plug-in to customize the aggregation strategy.

Figure 33:
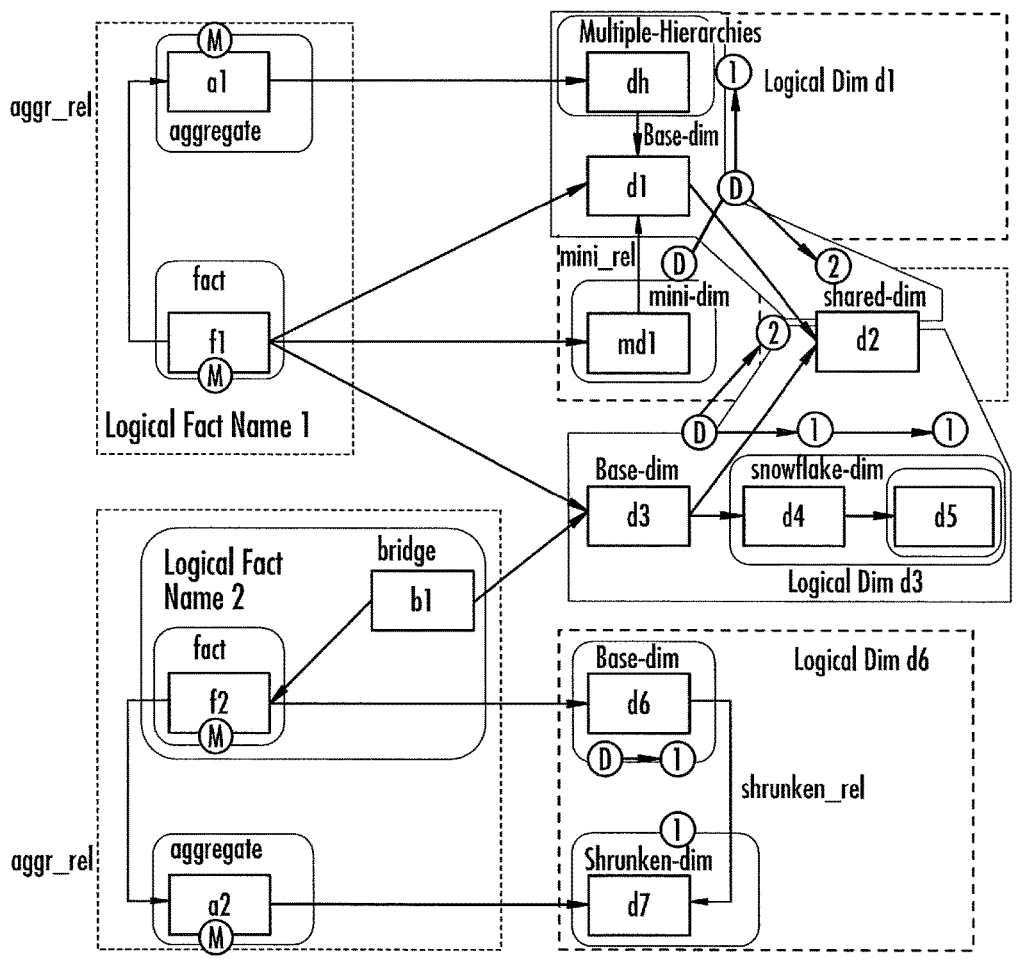
FIG. 33 is a diagram illustrating the derivation of logical table sources according to an embodiment of the subject matter described herein.
Figure 34:
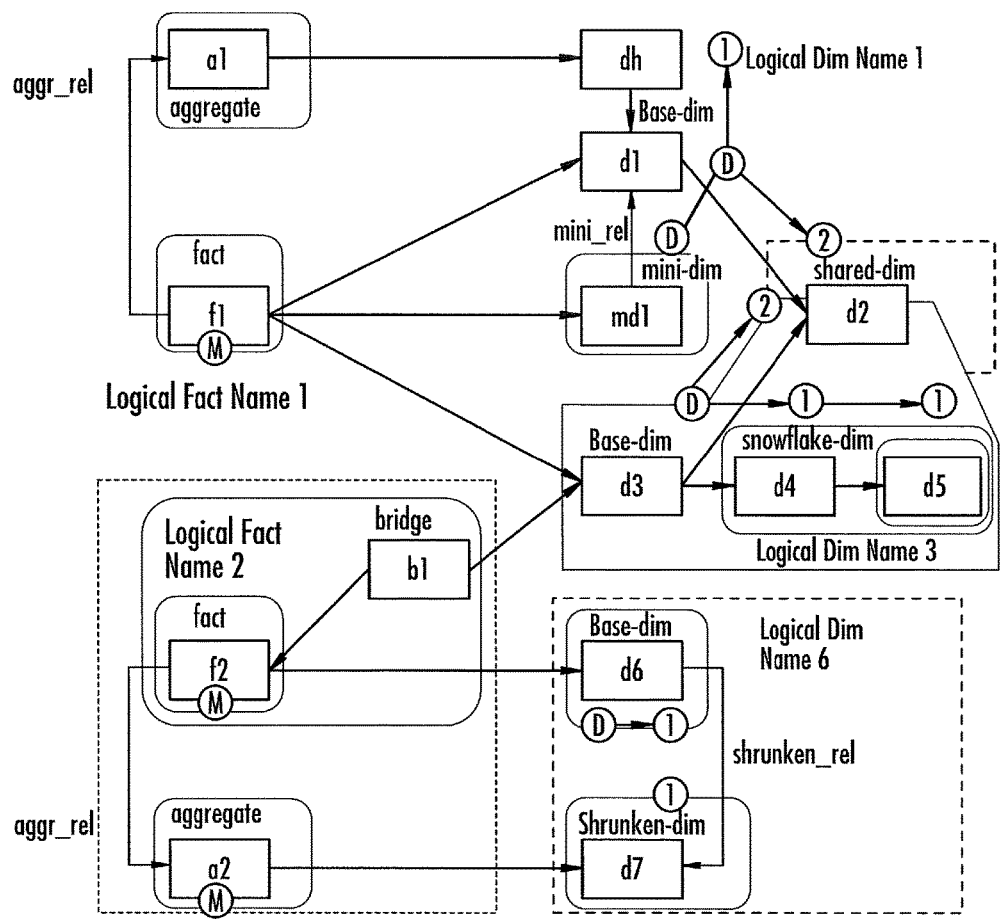
FIG. 34 is a diagram illustrating the identification of role playing dimensions according to an embodiment of the subject matter described herein.

FIG. 33 is a diagram illustrating the derivation of RPD logical table sources (LTSs) according to an embodiment of the subject matter described herein. An LTS is an OBIEE concept that associates different physical tables to logical tables. An LTS can contain a physical table reference or a dataset defined by joining multiple tables. In FIG. 33, the following observations may be noted:
  FIG. 33 illustrates the first process step that has dependencies on OBIEE RPD structure
  Logical fact and dimension groupings form a good base for the RPD Logical Tables
  Logical fact tables may have multiple LTSs for combinations of joined
    fact and bridges,
    dimension tables,
    or even multiple instances of hierarchy tables
  Mapping rules depend on the particular intent expressed by pattern identified in steps 4-5.
  Future: A plug-in may be used to customize creation of LTS FIG. 34 is a diagram illustrating the identification of role playing dimensions according to an embodiment of the subject matter described herein. In FIG. 34, the following steps may be performed:
  Determine the name of the Logical Dimension based on business name definitions in the FK column or its comments of base dimension
  For OBIEE RPD, role playing dimensions imply creation and use of separate alias physical tables
  Enable Shared Dimensions based on same business names.
  Future: Plug-in to customize naming for logical (role-playing) dimensions After the operations illustrated in FIG. 34, the following operations may be performed:
  Generate OBIEE XUDML from Logical Model
    Create physical, logical and presentation level mappings
    Most effort is in describing the logical model
    Create Aliases for all physical tables and generate aliases for role-playing scenarios
  Run OBIEE tool "biserverxmlexec" to convert XUDML into RPD It should be noted that the logical database schema generator described herein improves the technological field of database management by automating the construction of logical database schema. As such, a processor that implements the logical database schema generator described herein is a special purpose computer that facilitates data warehousing and accessing data stored in a data warehouse.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for automatic generation of logical database schemas from physical database tables and metadata, the method comprising:
  at a logical database schema generator executable by or embedded within at least one processor, wherein the logical database schema generator facilitates access to data stored in a data repository by automatically generating a logical database schema from physical database tables and metadata:
    identifying physical fact tables in a data repository, wherein identifying the physical fact tables includes determining that at least one physical fact table includes no incoming foreign keys unless from one or more bridge tables;
    identifying physical dimension tables in the data repository;
    mapping the physical fact tables to logical fact tables, wherein a first physical fact table is mapped to a first logical fact table;
    mapping the physical dimension tables to logical dimension tables, wherein a first physical dimension table is mapped to a first logical dimension table;

determining relationships between the physical fact and dimension tables, wherein determining the relationships between the physical fact and dimension tables includes using the metadata containing a first foreign key name associated with a foreign key naming convention, wherein the first foreign key name indicates a first foreign key and a cardinality of a table relationship between the first physical fact table and the first physical dimension table;

logically joining the logical fact and dimension tables based on the identified relationships between the physical fact and dimension tables to form a logical database schema, wherein logically joining the logical fact and dimension tables includes logically joining the first logical fact table and the first logical dimension table based on the table relationship indicated by the first foreign key name;

outputting the logical database schema to a repository data file; and performing, using the repository data file, a query based on user input to retrieve data from the physical fact tables and the physical dimension tables, wherein performing the query includes using information from the repository data file to generate a structured query, wherein the structured query includes database information that is lacking in the user input.

2. The method of claim 1 wherein identifying the physical fact and dimension tables includes identifying at least one of the physical fact and dimension tables using naming conventions for fact and dimension tables.

3. The method of claim 1 wherein identifying the physical fact and dimension tables includes identifying the physical fact and dimension tables using structural information regarding the physical fact and dimension tables.

4. The method of claim 3 wherein the structural information includes key information between the physical fact and dimension tables.

5. The method of claim 1 wherein mapping the physical fact tables to logical fact tables includes grouping fact tables and related bridge tables into logical groups.

6. The method of claim 5 comprising associating aggregates to the logical groups.

7. The method of claim 1 wherein mapping the physical dimension tables to logical dimension tables includes identifying logical dimensions D1 and merging snowflake and outrigger dimensions into base dimensions within each logical dimension.

8. The method of claim 1 wherein mapping the physical dimension tables to logical dimension tables includes merging physical dimension tables to form logical dimension tables based on relationships between the physical dimension tables.

9. The method of claim 1 wherein mapping the physical dimension tables to logical dimension tables includes deriving logical hierarchies and hierarchy levels from the physical fact and dimension tables.

10. A system for automatic generation of logical database schemas from physical database tables and metadata, the system comprising:

at least one processor; and a logical database schema generator executable by or embedded within the at least one processor, wherein the logical database schema generator facilitates access to data stored in a data repository by automatically generating a logical database schema from physical database tables and metadata, wherein the logical database schema generator is configured for:

identifying physical fact tables in a data repository, wherein identifying the physical fact tables includes determining that at least one physical fact table includes no incoming foreign keys unless from one or more bridge tables;

identifying physical dimension tables in the data repository;

mapping the physical fact tables to logical fact table, wherein a first physical fact table is mapped to a first logical fact table;

mapping the physical dimension tables to logical dimension tables, wherein a first physical dimension table is mapped to a first logical dimension table;

determining relationships between the physical fact and dimension tables, wherein determining the relationships between the physical fact and dimension tables includes using the metadata containing a first foreign key name associated with a foreign key naming convention, wherein the first foreign key name indicates a first foreign key and a cardinality of a table relationship between the first physical fact table and the first physical dimension table;

logically joining the logical fact and dimension tables based on the identified relationships between the physical fact and dimension tables to form a logical database schema, wherein logically joining the logical fact and dimension tables includes logically joining a first logical fact table and a first physical dimension table based on the table relationship indicated by the first foreign key name;

outputting the logical database schema to a repository data file; and performing, using the repository data file, a query based on user input to retrieve data from the physical fact tables and the physical dimension tables, wherein performing the query includes using information from the repository data file to generate a structured query, wherein the structured query includes database information that is lacking in the user input.

11. The system of claim 10 wherein identifying the physical fact and dimension tables includes identifying at least one of the physical fact and dimension tables using naming conventions for fact and dimension tables.

12. The system of claim 10 wherein identifying the physical fact and dimension tables includes identifying the physical fact and dimension tables using structural information regarding the physical fact and dimension tables.

13. The system of claim 12 wherein the structural information includes key information between the physical fact and dimension tables.

14. The system of claim 10 wherein mapping the physical fact tables to logical fact tables includes grouping fact tables and related bridge tables into logical groups.

15. The system of claim 14 comprising associating aggregates to the logical groups.

16. The system of claim 10 wherein mapping the physical dimension tables to logical dimension tables includes identifying logical dimensions D1 and merging snowflake and outrigger dimensions into base dimensions within each logical dimension.

17. The system of claim 10 wherein mapping the physical dimension tables to logical dimension tables includes merging physical dimension tables to form logical dimension tables based on relationships between the physical dimension tables.

18. The system of claim 10 wherein mapping the physical dimension tables to logical dimension tables includes deriving logical hierarchies and hierarchy levels from the physical fact and dimension tables.

19. The system of claim 10 wherein the at least one processor and the logical database schema generator for a special purpose computer that facilitates access to data stored in the data repository.

20. A non-transitory computer readable medium having stored thereon executable instructions that when executed by a processor of a computer control the computer to perform steps comprising:
   at a logical database schema generator executable by or embedded within at least one processor, wherein the logical database schema generator facilitates access to data stored in a data repository by automatically generating a logical database schema from physical database tables and metadata:
      identifying physical fact tables in a data repository, wherein identifying the physical fact tables includes determining that at least one physical fact table includes no incoming foreign keys unless from one or more bridge tables;
      identifying physical dimension tables in the data repository;
      mapping the physical fact tables to logical fact tables, wherein a first physical fact table is mapped to a first logical fact table;
      mapping the physical dimension tables to logical dimension tables, wherein a first physical dimension table is mapped to a first logical dimension table;
      determining relationships between the physical fact and dimension tables, wherein determining the relationships between the physical fact and dimension tables includes using the metadata containing a first foreign key name associated with a foreign key naming convention, wherein the first foreign key name indicates a first foreign key and a cardinality of a table relationship between the first physical fact table and the first physical dimension table;
   logically joining the logical fact and dimension tables based on the identified relationships between the physical fact and dimension tables to form a logical database schema, wherein logically joining the logical fact and dimension tables includes logically joining the first logical fact table and the first logical dimension table based on the table relationship indicated by the first foreign key name;
   outputting the logical database schema to a repository data file; and
   performing, using the repository data file, a query based on user input to retrieve data from the physical fact tables and the physical dimension tables, wherein performing the query includes using information from the repository data file to generate a structured query, wherein the structured query includes database information that is lacking in the user input.

* * * * *

UNITED STATES PATENT AND TRADEMARK OFFICE
CERTIFICATE OF CORRECTION

PATENT NO. : 10,169,378 B2
APPLICATION NO. : 14/484227
DATED : January 1, 2019
INVENTOR(S) : Sassin Page 1 of 1

It is certified that error appears in the above-identified patent and that said Letters Patent is hereby corrected as shown below:

On the Title Page

Column 2, under Attorney, Agent or Firm, Line 1, delete "Taylor" and insert -- Taylor, --, therefor.

In the Specification

In Column 4, Line 22, delete "that that" and insert -- that --, therefor.

In Column 8, Line 30, delete "posffix" and insert -- postfix --, therefor.

In Column 8, Line 46, delete "posffix" and insert -- postfix --, therefor.

In Column 11, Line 4, delete "con.," and insert -- conv., --, therefor.

In Column 15, Line 35, delete "posffix" and insert -- postfix --, therefor.

In Column 18, Line 21, delete "FIG." and insert -- FIGS. --, therefor.

In Column 20, Line 34, delete "23" and insert -- 23. --, therefor.

Signed and Sealed this
Seventh Day of January, 2020

Andrei Iancu
*Director of the United States Patent and Trademark Office*